(12) United States Patent
Whelan

(10) Patent No.: US 9,388,693 B2
(45) Date of Patent: Jul. 12, 2016

(54) CONVEYOR SYSTEM

(71) Applicant: DW Technologies Pty Ltd, Queensland (AU)

(72) Inventor: Darren John Whelan, Queensland (AU)

(73) Assignee: DW Technologies Pty Ltd, Queensland (AU)

( * ) Notice: Subject to any disclaimer, the term of this patent is extended or adjusted under 35 U.S.C. 154(b) by 0 days.

(21) Appl. No.: 14/390,175

(22) PCT Filed: Mar. 28, 2013

(86) PCT No.: PCT/AU2013/000332
§ 371 (c)(1),
(2) Date: Oct. 2, 2014

(87) PCT Pub. No.: WO2013/149292
PCT Pub. Date: Oct. 10, 2013

(65) Prior Publication Data
US 2015/0075949 A1 Mar. 19, 2015

(30) Foreign Application Priority Data

Apr. 3, 2012 (AU) ................................. 2012901317

(51) Int. Cl.
| | |
|---|---|
| *B65G 23/44* | (2006.01) |
| *E21F 13/08* | (2006.01) |
| *B65G 21/10* | (2006.01) |
| *B65G 15/08* | (2006.01) |
| *B65G 15/60* | (2006.01) |
| *B65G 21/14* | (2006.01) |

(52) U.S. Cl.
CPC ............... *E21F 13/08* (2013.01); *B65G 15/08* (2013.01); *B65G 15/60* (2013.01); *B65G 21/10* (2013.01); *B65G 21/14* (2013.01); *B65G 23/44* (2013.01)

(58) Field of Classification Search
USPC ................................................. 198/813, 819
See application file for complete search history.

(56) References Cited

U.S. PATENT DOCUMENTS

| | | | |
|---|---|---|---|
| 4,505,382 A | | 3/1985 | Mareau |
| 4,526,272 A | * | 7/1985 | Peterson ...................... 198/819 |

(Continued)

FOREIGN PATENT DOCUMENTS

| | | | |
|---|---|---|---|
| EP | 0345193 A1 | 12/1989 | |
| GB | 1351132 A | 4/1974 | |
| WO | WO-2012/149596 A1 | 11/2012 | |
| WO | WO 2012149596 A1 * | 11/2012 | ............. B65G 21/00 |
| WO | WO-2013/149292 A1 | 10/2013 | |

OTHER PUBLICATIONS

"International Application Serial No. PCT/AU2013/000332, International Preliminary Report on Patentability mailed Oct. 16, 2014", 8 pgs.
"International Application Serial No. PCT/AU2013/000332, Written Opinion mailed May 20, 2013", 6 pgs.
"International Application Serial No. PCT/AU2013/000332, International Search Report mailed May 20, 2013", 4 pgs.

*Primary Examiner* — Gene Crawford
*Assistant Examiner* — Lester Rushin
(74) *Attorney, Agent, or Firm* — Schwegman Lundberg & Woessner, P.A.

(57) ABSTRACT

A conveyor system including a track extending between a loading region and a discharge region, an endless belt bendable into a tubular shape, the endless belt having thickened edges, a number of carriages moveably mounted to the track, the carriages including belt rollers for engaging the edges of the belt to thereby support the belt, a loading carriage for allowing material to be loaded onto the belt, the loading station being moveable at least within the loading region, a discharge carriage for allowing material to be discharged from the belt, the discharge station being moveable at least within the discharge region and a number of intermediate carriages positioned between the loading and discharge carriages for supporting the belt along transport and return paths with the tubular shape.

20 Claims, 22 Drawing Sheets

(56) References Cited

U.S. PATENT DOCUMENTS

| | | | |
|---|---|---|---|
| 4,657,131 A * | 4/1987 | Brychta et al. | 198/810.04 |
| 5,860,510 A | 1/1999 | Becker | |
| 7,032,744 B1 * | 4/2006 | Pietsch | 198/819 |
| 7,878,322 B2 * | 2/2011 | Kawamata | 198/813 |
| 7,926,640 B2 * | 4/2011 | Fuchs | 198/314 |
| 2001/0023815 A1 * | 9/2001 | Mott | 198/617 |
| 2005/0185988 A1 * | 8/2005 | Mochimaru | G03G 15/755 399/165 |
| 2005/0241130 A1 * | 11/2005 | Ramnauth et al. | 29/56.5 |

* cited by examiner

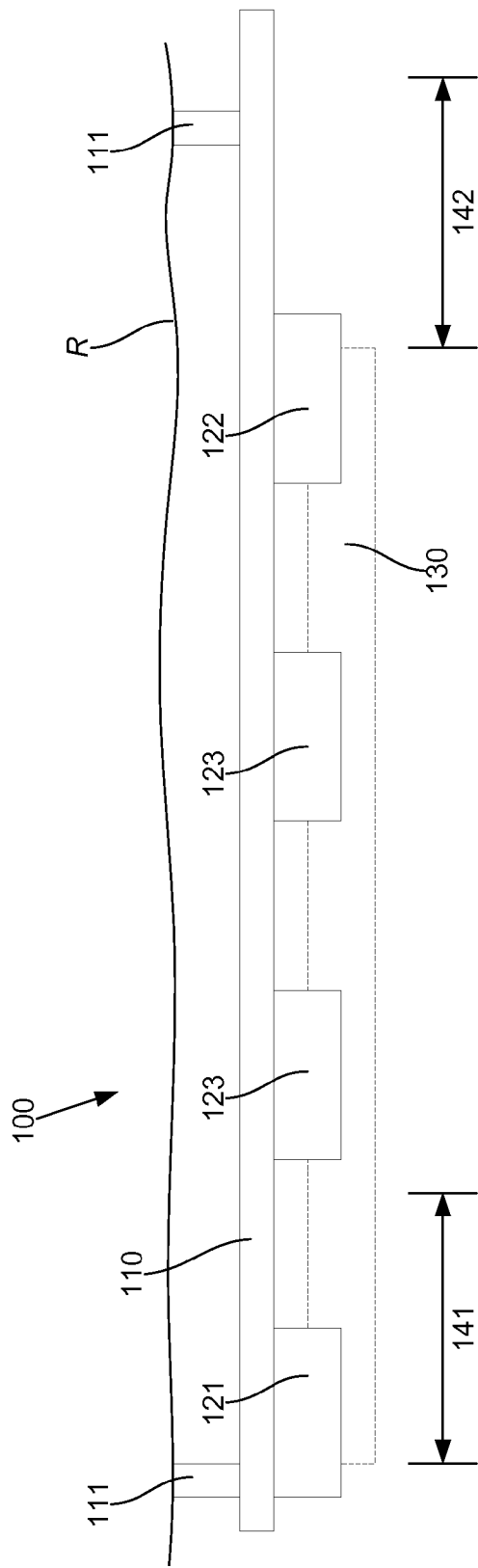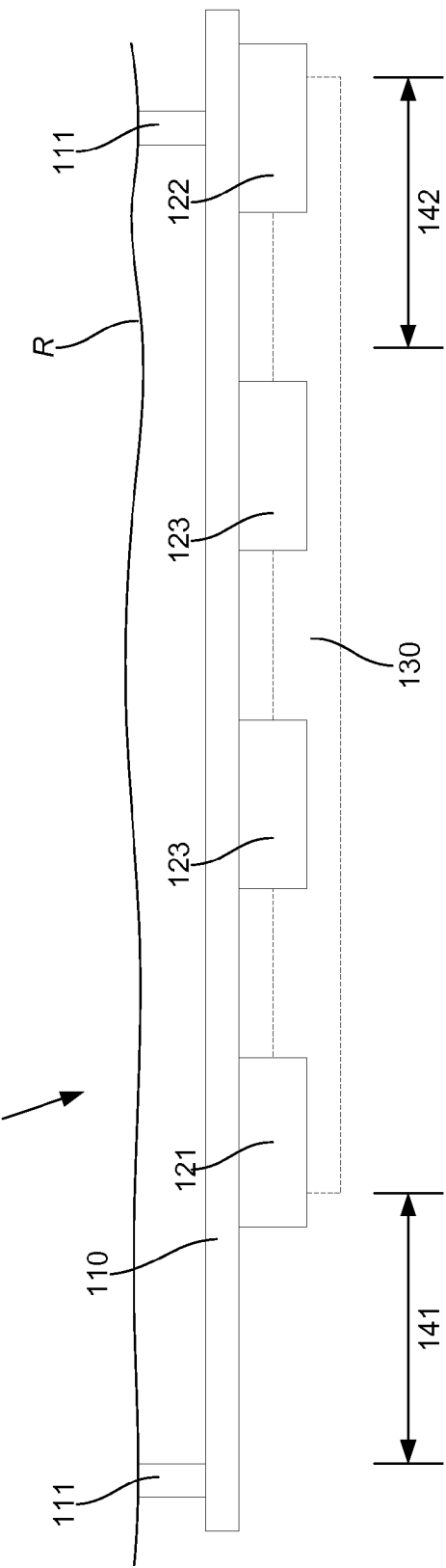

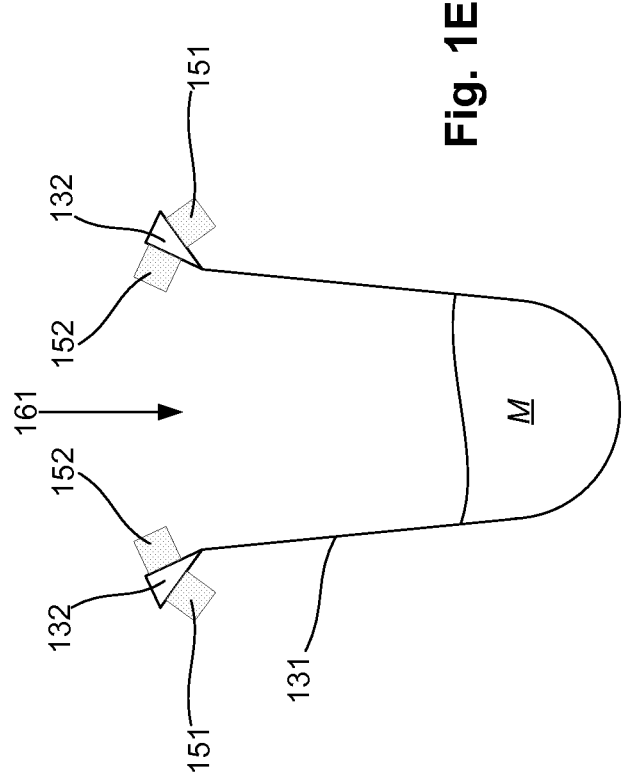
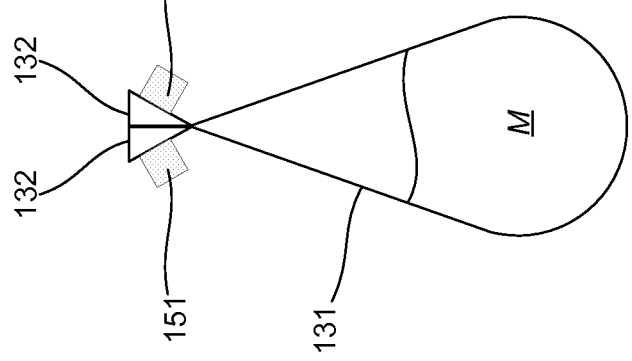
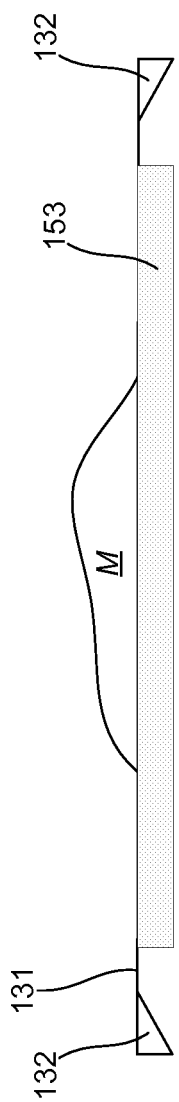

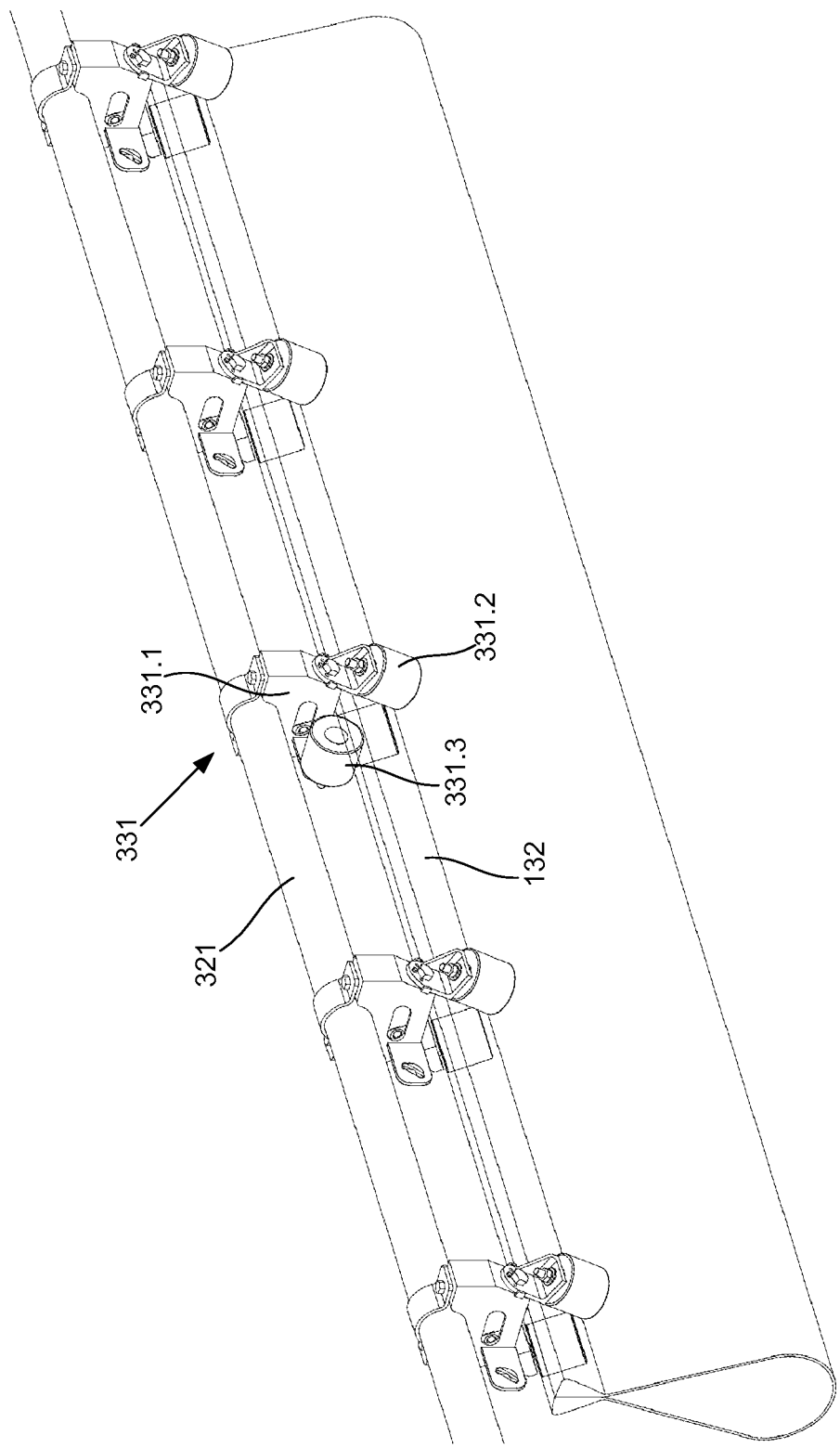

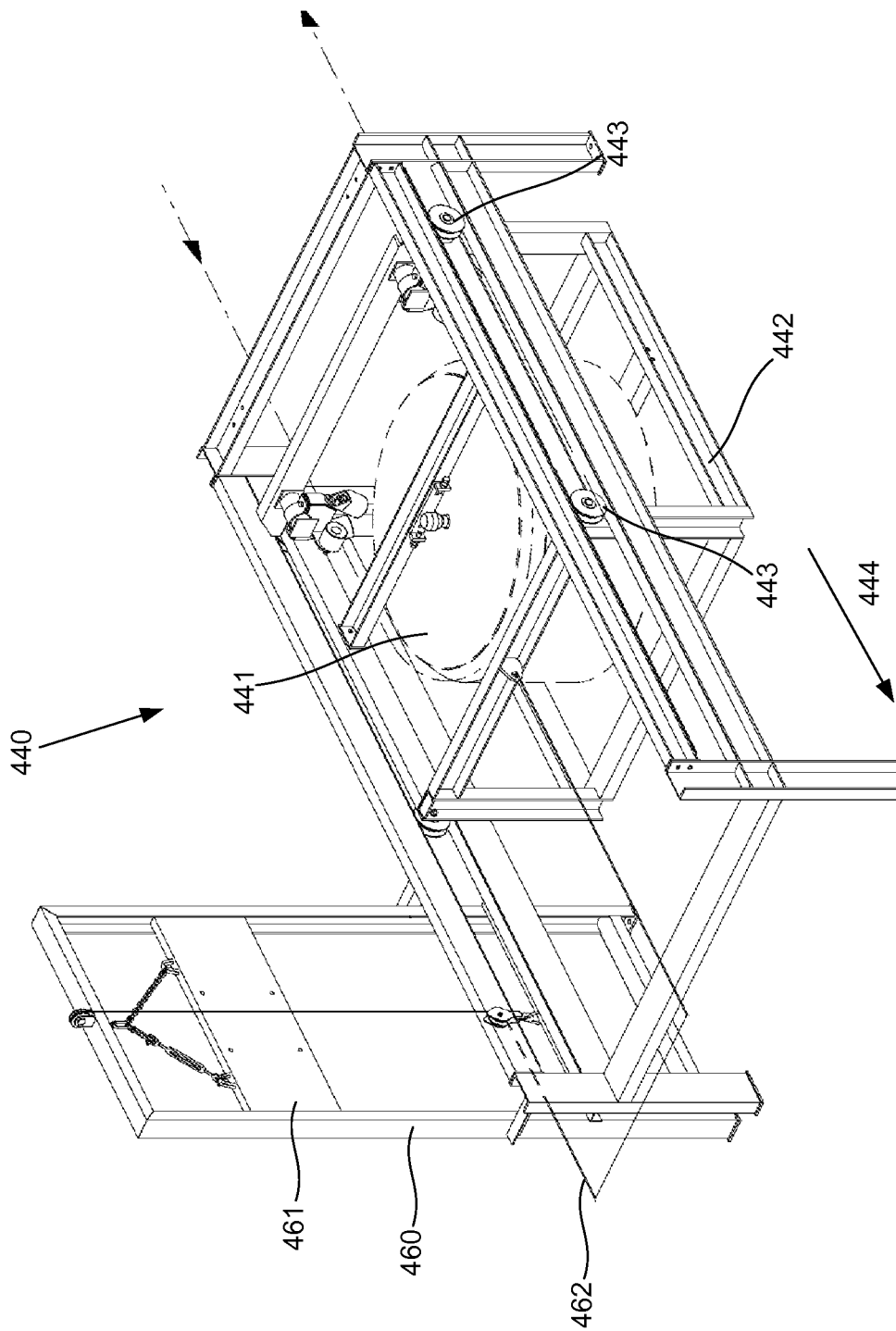

CONVEYOR SYSTEM

PRIORITY APPLICATIONS

This application is a U.S. National Stage Filing under 35 U.S.C. §371 from International Application No. PCT/AU2013/000332, filed on 28 Mar. 2013, and published as WO/2013/149292 on 10 Oct. 2013, which application claims the benefit under 35 U.S.C. §119 to Australian Application No. 2012901317, filed on 3 Apr. 2012; which applications and publication are incorporated herein by reference in their entirety.

BACKGROUND OF THE INVENTION

The present invention relates to a conveyor system, and in one particular example, to a conveyor system for use in mining.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The introduction of Longwall Mining to the Australian Coal Industry in the early eighties and the acceptance of this technology by mining companies, resulted in more efficient and cost effective methods of production and plant utilisation. This change within the Industry has brought about a broadening of market opportunities not only for the mining companies but also for plant/equipment suppliers.

To set up Longwall Systems in an Underground Coal Mining application, Gateroads are required to be developed. These Gateroads run according to the geometric location of the coal seam. They are developed by a Continuous Miner, which cuts through the coal seam to create a path (Gateroad), in which the Longwall System can be set up to remove a large panel of coal (usually between 150-400 m length). The Gateroad developments are generally between 0-200 m from the Panel Belt Conveyor (Panel Belt). The Panel Belt then delivers the coal to the aboveground prep area. To deliver the coal from the Continuous Miner, to the Panel Belt, generally Shuttle Cars are used. Shuttle Cars remain the principal method of coal clearance from behind the Continuous Miner despite its' ageing technology and ongoing inadequacies. They also contribute significantly to capital and maintenance costs, as well as causing numerous personnel injuries and deaths.

Current Longwall Mining methods accepted within the Australian and Overseas Industry, consist of a Beltroad and a Travelroad running parallel with intermediate cut-throughs. Because these cut-throughs are developed at 90 degrees to the roads, conventional continuous flow materials handling systems are not suitable. The cut-throughs are necessary for various reasons and Shuttle Cars have to and are designed to negotiate these sharp corners.

U.S. Pat. No. 5,860,510 describes a hose belt conveyor, comprising an elongated belt, which can be folded to a closed hose. At the edges it is provided with thickened parts which are placed resting against each other during the formation of the hose. These thickened parts bound a V-shaped part which widens in the direction away from the hose which has been formed by the belt. Said V-shaped part according to the invention is placed between two drive rollers. By selecting the angle of the V-shaped part between 30 and 90 degrees, it has been found that it is possible to provide for the hose belt conveyor to be driven like a V-belt. The document also describes a drive unit for the hose belt conveyor.

SUMMARY OF THE PRESENT INVENTION

In a first broad form the present invention seeks to provide a conveyor system including:
  a) a track extending between a loading region and a discharge region;
  b) an endless belt bendable into a tubular shape, the endless belt having thickened edges;
  c) a number of carriages moveably mounted to the track, the carriages including belt rollers for engaging the edges of the belt to thereby support the belt;
    i) a loading carriage for allowing material to be loaded onto the belt, the loading station being moveable at least within the loading region;
    ii) a discharge carriage for allowing material to be discharged from the belt, the discharge station being moveable at least within the discharge region; and,
    iii) a number of intermediate carriages positioned between the loading and discharge carriages for supporting the belt along transport and return paths with the tubular shape.

Typically the conveyor system includes a number of belt driver rollers for driving the belt, the belt driver rollers being provided on at least some of the carriages.

Typically carriages further include a carriage drive for moving the carriage relative to the track.

Typically each carriage includes:
  a) a frame;
  b) a number of roller stations mounted to the frame, the roller stations supporting the belt rollers; and,
  c) a coupling for movable mounting the carriage relative to the track.

Typically the coupling includes carriage rollers coupled to the frame via a bracket.

Typically frame includes a safety guard extending around the belt transport and return paths.

Typically frame supports ducting for services.

Typically, for intermediate carriages, the frame includes:
  a) spaced apart elongate roller station support members for supporting roller stations for the transport and return paths, respectively; and,
  b) a number of lateral frame members for supporting the elongate roller station support members.

Typically the loading carriage includes:
  a) a former mounted to the frame, the former including a loading aperture; and,
  b) belt rollers for urging edges of the belt against the former so that the belt edges are guided apart by the former thereby allowing material to be loaded onto the belt through the loading aperture.

Typically the loading carriage includes a belt return roller for transporting the belt between the return path and the transport path.

Typically the loading carriage includes:
  a) a belt return roller for transporting the belt between the return path and the transport path;

b) a roller station or supporting belt rollers; and, c) a chute mounted to the frame to define a loading aperture between the belt return roller and the roller station.

Typically the conveyor system includes chute belt rollers for supporting the belt as it is transported from the belt return roller to the idler roller station.

Typically the belt return roller is movably mounted to the frame to allow movement of the belt return roller to be used in maintaining a belt tension.

Typically the loading carriage includes a biasing mechanism for biasing the belt return roller.

Typically the loading carriage includes:

a) a first loading frame for supporting at least the former; and, b) a second loading frame for supporting a belt return roller.

Typically the discharge carriage includes a discharge roller supported by the frame, the discharge roller supporting the belt in an open shape, the discharge roller transporting the belt from the transport to the return path.

Typically the discharge carriage includes:

a) a first discharge frame for supporting the discharge roller; and, b) a second discharge frame for supporting a number of roller stations to guide the belt onto and from the discharge roller.

Typically the carriages are suspended substantially below the track in use.

Typically the rack is a monorail track.

Typically the belt is supported inside out on the return path compared to the transport path.

BRIEF DESCRIPTION OF THE DRAWINGS

An example of the present invention will now be described with reference to the accompanying drawings, in which: —

FIGS. 1B and 1C are schematic side views of the conveyor system of FIG. 1A;

FIGS. 1D to 1F are schematic end views of the conveyor belt in transport loading and discharge configurations;

FIG. 3C is a schematic perspective view of an example of idler rollers for supporting the conveyor belt;

FIG. 4D is a schematic perspective view of a second example of a second loading frame for supporting a belt return roller;

DETAILED DESCRIPTION OF THE PREFERRED EMBODIMENTS

Figure 1A:
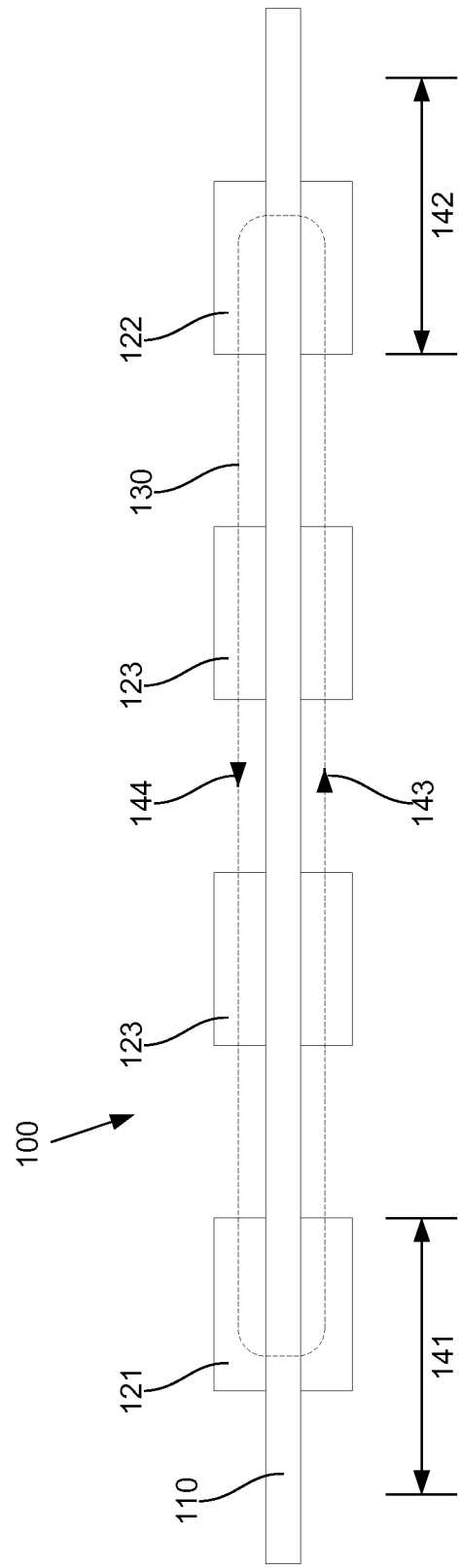
FIG. 1A is a schematic plan view of a first example of a conveyor system.

An example of a conveyor system will now be described with reference to FIGS. 1A to 1F.

In this example, the conveyor system 100 includes a track 110 extending between a loading region 141 and a discharge region 142. The conveyor system 100 includes an endless belt 130, bendable into a tubular shape and having thickened edges to allow the belt to be supported by a number of belt rollers, which are in turn mounted on a number of carriages 121, 122, 123 that are moveably mounted to the track 110.

The carriages typically include a loading carriage 121 which is movable within the loading region 141 to allow material to be loaded onto the belt, a discharge carriage 122 movable within the discharge region 142, to allow material to be discharged from the belt, and one or more intermediate carriages 123 positioned between the loading and discharge carriages 121, 122, to support the belt along a transport and return path indicated by the arrows 143, 144.

By movably mounting the carriages 121, 122, 123 to the track 110, this allows the relative position of the carriages, and hence the belt 130 to be moved. This, in turn, allows a loading point and discharge point for the conveyor system 100 to be moved within the loading and discharge regions 141, 142, respectively. This is particular beneficial in accommodating movement of equipment that is providing the material to be transported. In particular, this allows a loading point to be moved in accordance with movement of a mining, or other similar machine, allowing materials to be continuously removed, in turn improving efficiency of mining operations, as will be described in more detail below.

A further benefit is that the use of the tubular-shaped belt 130 is that the conveyor belt 130 can move along curved transport and return paths, meaning that the conveyor belt is not constrained for use in straight-line scenarios. This makes the arrangement ideal for use in underground mines, or the like, as will be described in more detail below.

A number of further features will now be described.

In particular, the track 110 may be any form of track 110 that is capable of supporting carriages 121, 122, 123, but in one example is in the form of a monorail track which can be suspended from a roof R of a mine or other similar environment, via track supports 111. In this example the carriages 121, 122, 123 can be suspended substantially below the track 110. It will be appreciated however that this is not essential and alternatively other forms of track may be used, such as a standard rail track utilised to support carriages thereabove.

The carriages can be of any suitable arrangement, but typically include a frame, and a number of roller stations mounted to the frame, the roller stations supporting the belt rollers. A coupling, such as arrangement of carriage rollers, is provided for movably mounting the carriage relative to the track, and this may include a drive, such as a motor, for moving the carriages.

The endless belt 130 may be of any suitable configuration. When used underground, the belt is typically a FRAS (Fire Resistant Anti Static) rubber conveyor belt, including a central belt body 131 and thickened edges 132, which are generally triangular or wedge-shaped, to allow the belt 130 to be supported in use. Typically, when the belt is being moved between the loading and discharge carriages 121, 122, the belt is supported in the configuration shown in FIG. 1D, with belt rollers 151 engaging outer surfaces of the thickened edges 132, whilst the edges 132 are provided in contact, so as to define an enclosed region for containing the material M being transported.

When the belt 130 is to be loaded within the loading carriage 121, it is typical for the edges 132 of the belt to be separated to allow material to be provide therein via an opening 161 defined between the belt edges 132. In order to achieve this, the thickened edges 132 are typically supported in a spaced apart arrangement utilising a combination of belt rollers 151 and either additional belt rollers or a former shown generally at 152.

When material is to be discharged from the belt 130, it is typical for the belt 130 to be opened into a flat arrangement with the belt body 131 supported by one or more belt rollers 153 as shown in FIG. 1F. This allows material M to be discharged from the conveyor belt 130 in accordance with standard conveyor belt configurations.

Accordingly, it will be appreciated that in use the loading carriage 121 operates to support the belt in the configuration shown in FIG. 1E, the discharge carriage 123 supports the belt as shown in FIG. 1F, whilst the intermediate carriages 122 support the belt as shown in FIG. 1D.

Figure 2:
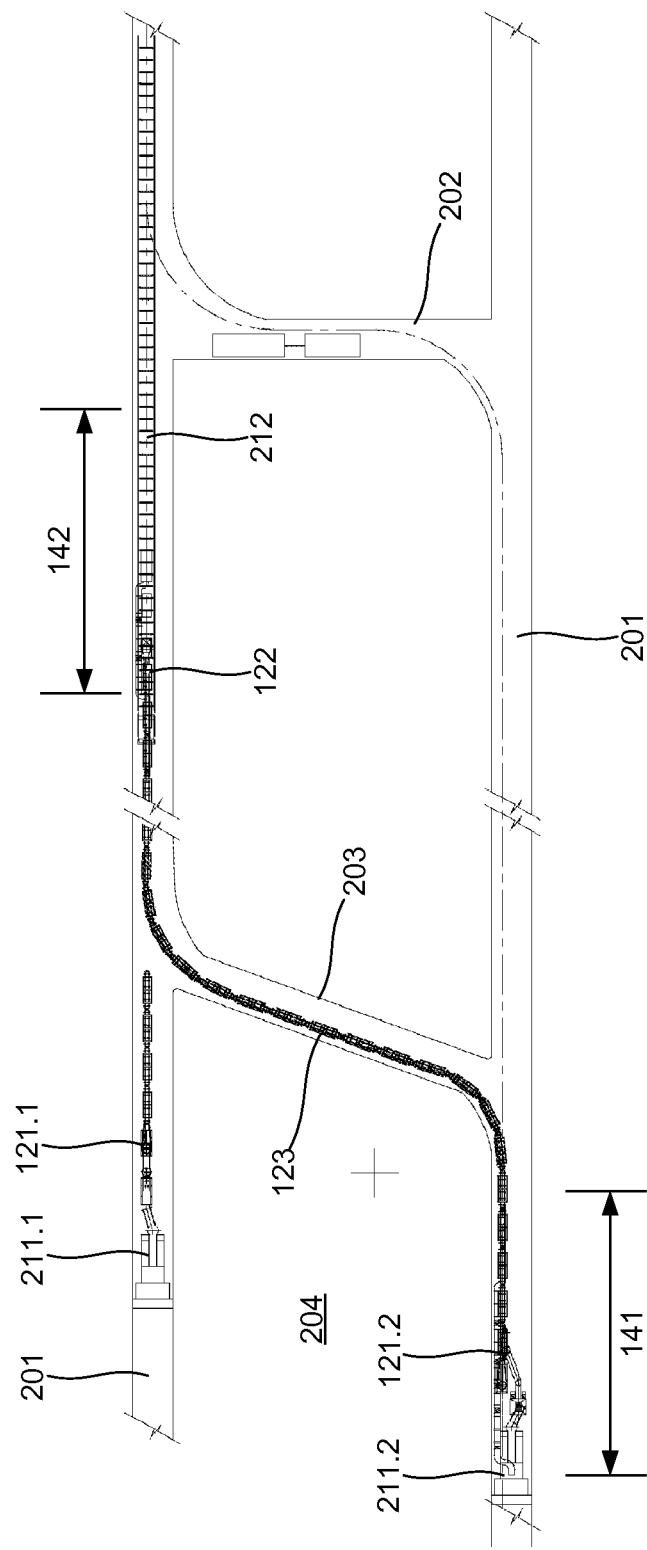
FIG. 2 is a schematic plan view of an example of the use of the conveyor system of FIG. 1A in a long wall mine.

An example of the use of the conveyor system 100 in a long wall mine will now be described with reference to FIG. 2.

In this example, the mine includes spaced-apart parallel gate roads 201, which are typically interconnected via cut-throughs 202, 203. The gate roads are developed by continuous miners shown generally at 211.1, 211.2, before a long wall miner is used to mine material from the panel between the gate roads 201. During creation of the gate roads 201, material needs to be delivered from the continuous miners 211, to a panel belt conveyor 212, which then removes the material from the mine, allowing this to be deposited in an aboveground preparation area. To achieve this, the continuous miners 211 will typically include an in-built conveyor system, which is capable of delivering material to a point a short distance behind the continuous miner.

In conventional arrangements, material is collected at this point using a shuttle car, which then transports the material to the panel belt conveyor 212. However, this means that the continuous miners 211 are only capable of mining at a rate determined by the ability of the shuttle cars to remove material, which typically is significantly slower than the rate of operation of the continuous miner. This problem is further exacerbated by the fact that mining cannot occur when a shuttle car is not available to remove material, and this inherently requires mining to be performed in a series of discrete operations, rather than continuously, which is extremely inefficient. Finally, the requirement to have the shuttle cars driven by an operator introduces additional unwanted hazards in the mining operation.

In the current example, the above described conveyor system 100 can be used to allow more effective operation of the continuous miners 211. In this regard, the track 110 can be fitted within the mine to extend from the gate road 201 currently under construction, through to the panel belt conveyor 212, either directly, or via a cut-through 203, as appropriate.

The loading carriage 121 can then be positioned directly behind the continuous miner 211, so that as the continuous miner 211 mines material, this is delivered directly via the in-built conveyor system, to the loading carriage 121. This process may also involve crushing the material so that the material has a maximum particle size, making the material easier to transport. In any event, this allows the material to be transported using the conveyor belt 130 and the intermediate carriages 123, to the discharge carriage 122, so that material can be discharged onto the panel belt conveyor 212. As the continuous miner 211 advances, the loading carriage 121, the discharge carriage 122 and intermediate carriages 123 can be advanced along the track 110 so that material can be continuously loaded onto the conveyor belt 130 via the loading carriage 121. When the loading carriage 121 approaches the end of the installed section of track, additional track can be installed, allowing the loading carriage 121 to be further advanced as required.

Thus, the above described arrangement allows the continuous miners 211 to mine continuously, with material being continuously transported to the panel belt conveyor 212. This avoids the problems associated with the use of shuttle cars, which in particular leads to discrete removal of removal from the continuous miner, which in turn impacts on the operating efficiency of the continuous miner.

As shown, multiple tracks 110 could be provided so that each of the continuous miners 211.1, 211.2 could feed a respective loading carriage 121.1, 121.2, with these terminating with respective discharge carriages, in the discharge region. It will also be appreciated from this, that the track can be curved or straight, allowing a significant number of different arrangements to be accommodated.

A number of further features will now be described with reference to specific examples of the loading, discharge and intermediate carriages. In particular, an example of an intermediate carriage 123 will now be described with reference to FIGS. 3A to 3D.

Figure 3A:
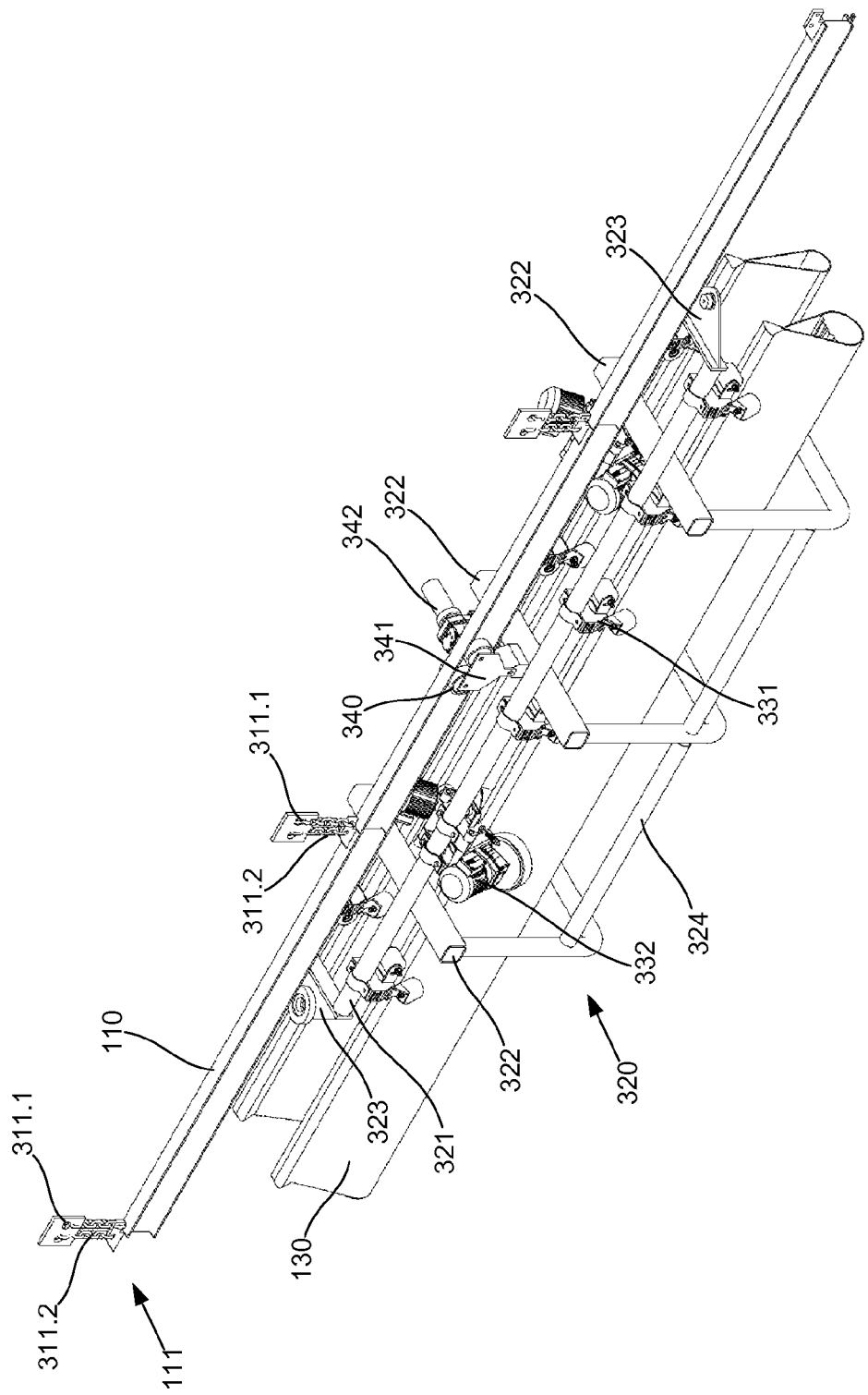
FIG. 3A is a schematic perspective view of a first example of an intermediate carriage.
Figure 3B:
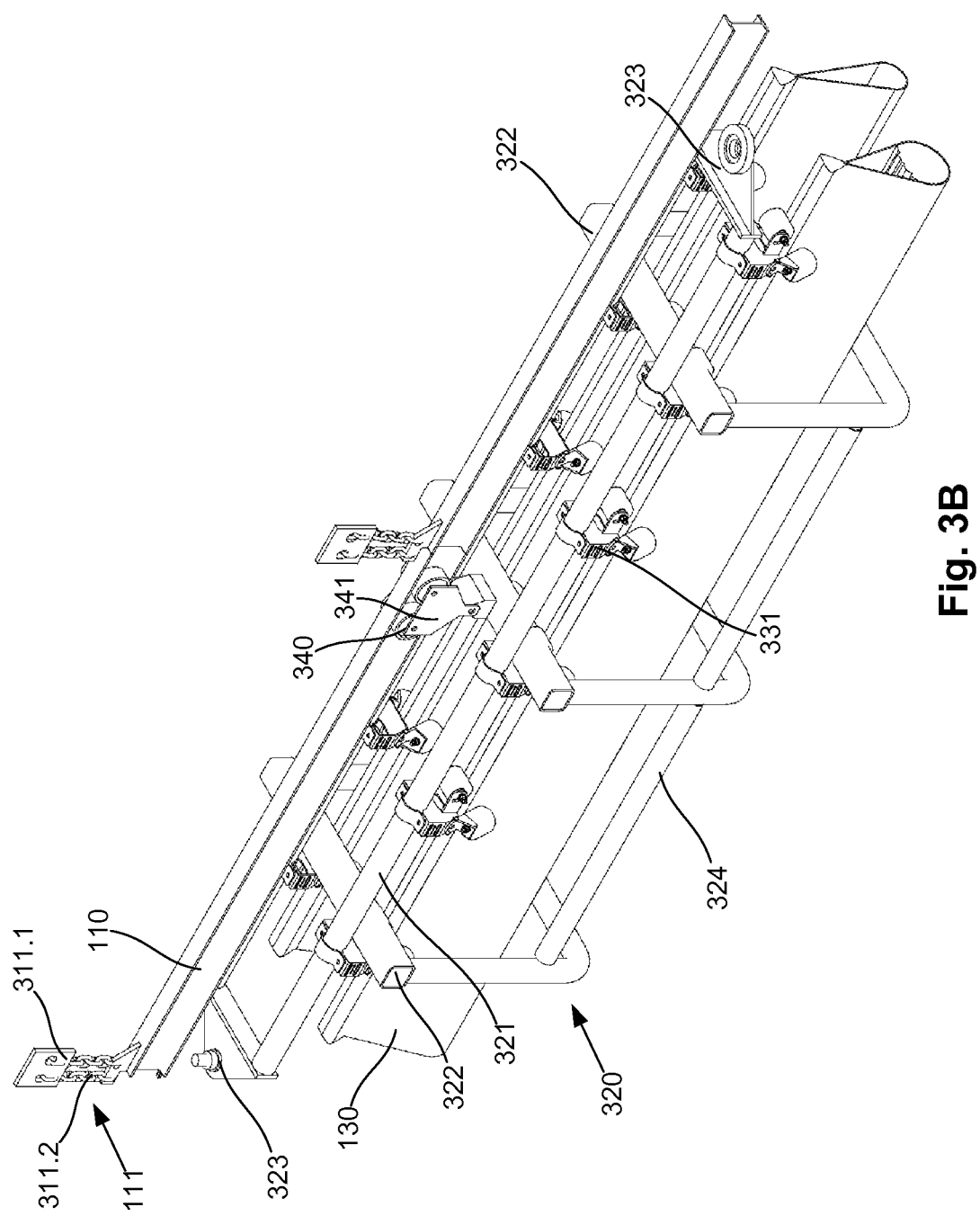
FIG. 3B is a schematic perspective view of a second example of an intermediate carriage.

In the examples of FIGS. 3A and 3B, the intermediate carriages 123 include a carriage frame 320, including spaced-apart elongate roller station support members 321, for supporting roller stations for the transport and return paths. The roller station support members 321 are interconnected and hence supported by lateral frame members 322, and optional end pieces 323, which can be used to couple the carriage 123 to other adjacent carriages.

The lateral frame members 322 can also be utilised to support a safety guard 324, which extends generally around the conveyor belt on both the transport and return paths. The roller station support members 321 are typically in the form of steel tubes, whilst the remainder of the frame can be made of rectangular hollow section (RHS) beams, or similar.

The frame is movably mounted to the track 110 via carriage rollers 340, coupled to the frame 320 via a bracket 341. A drive motor 342 is connected to the carriage rollers 340, allowing the carriage to be moved along the track 110 using a suitable control, which will be described in more detail below.

The roller station support members 321 support a number of roller stations, which in the example of FIG. 3A includes idler roller stations 331, and in the example of FIG. 3B includes both idler roller stations 331 and driver roller stations 332. The idler roller stations 331 are shown in more detail in FIG. 3C, and include a roller station bracket 331.1, coupled to the roller station support member 321, which supports angled belt rollers 331.2 for engaging the belt edges 132 and optionally an additional upper belt roller 331.3, which urges the belt edges 132 into engagement with the angled belt rollers 331.2.

Figure 3D:
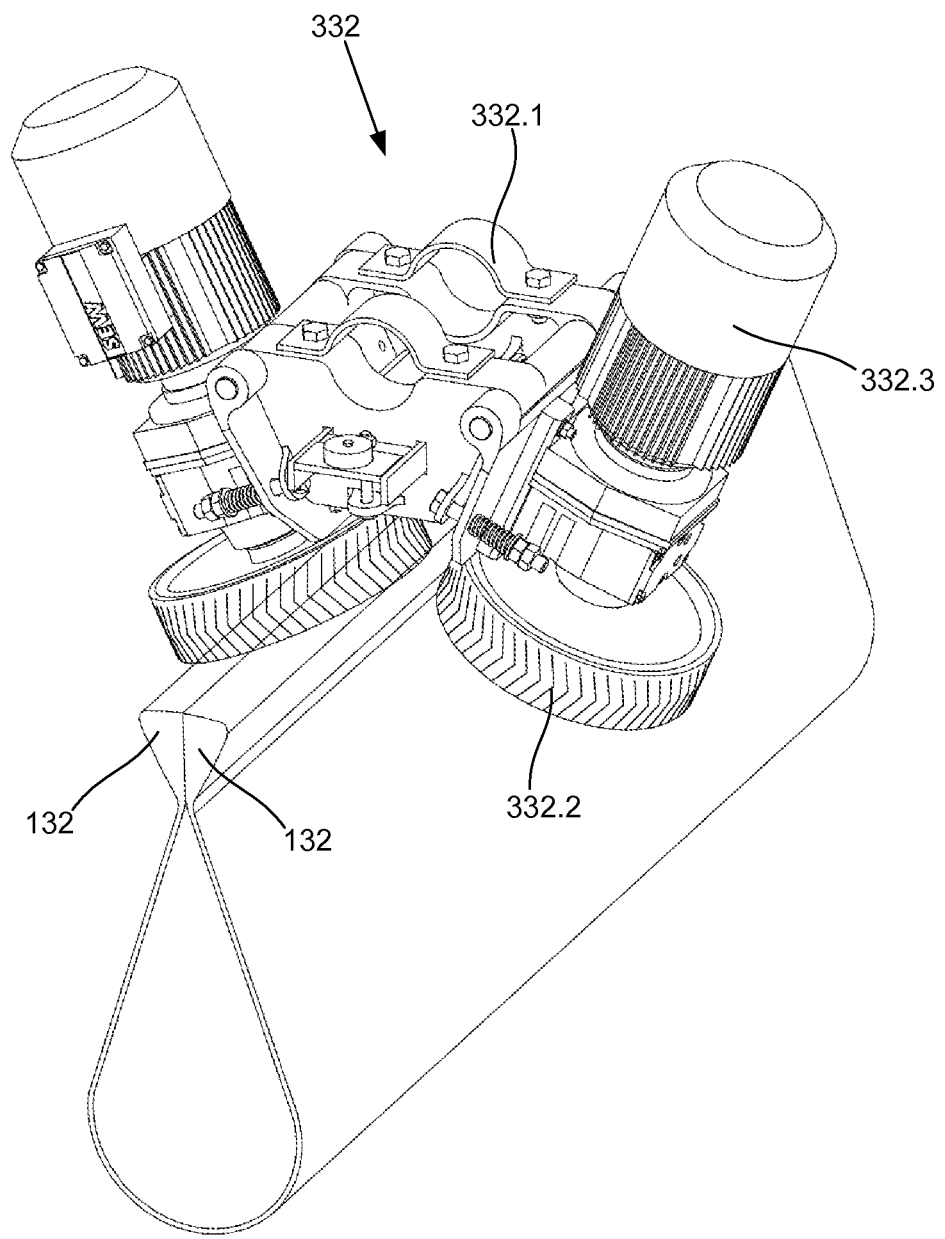
FIG. 3D is a schematic perspective view of an example of belt driver rollers.

In the case of the driver stations 332, these are generally of a similar form, and as shown in FIG. 3D include a mounting bracket 332.1, coupled to the roller station support member 321 and which supports angled belt driver rollers 332.2, for engaging the belt edges 132. The belt driver rollers 332.2 are coupled to roller motors 332.3, for driving the belt rollers 332.2, and thereby imparting a driving force on the belt 130.

Typically a number of driver stations are provided along the entire length of the conveyor belt 130 so that the belt is evenly driven along its length. This avoids unnecessary force being applied to the belt in any one particular area, which in turn can have an impact on belt wear and operation.

Accordingly, the intermediate carriages 123 will typically include a mixture of intermediate carriages shown in FIGS. 3A and 3B, so that some of the carriages will include driver roller stations 332, whilst some include idler roller stations 331 only. Consequently, the conveyor belt 130 need not be driven at each intermediate carriage 123, although this is not essential and alternatively driving may occur at every carriage, depending on the preferred implementation.

Figure 4A:
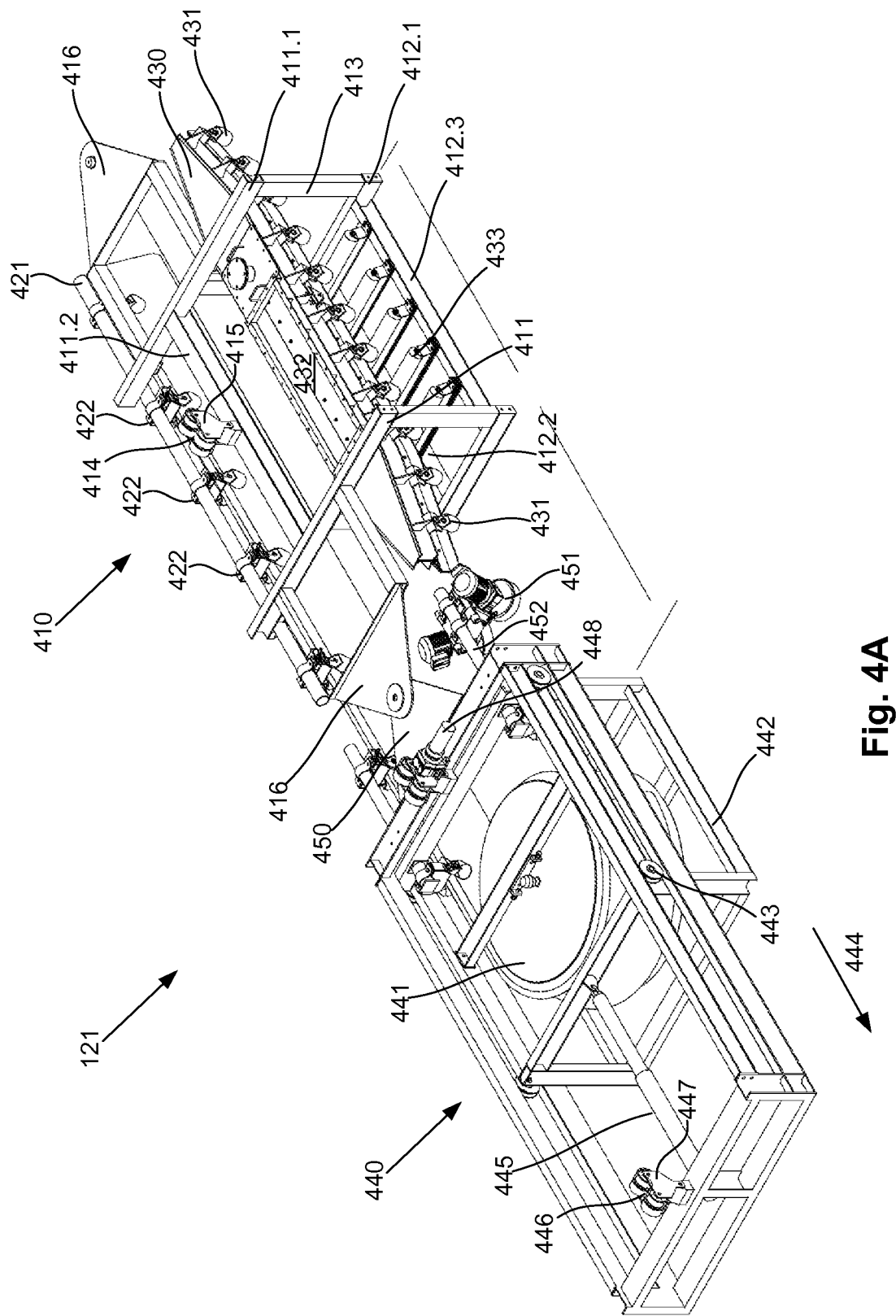
FIG. 4A is a schematic perspective view of an example of a loading carriage.
Figure 4B:
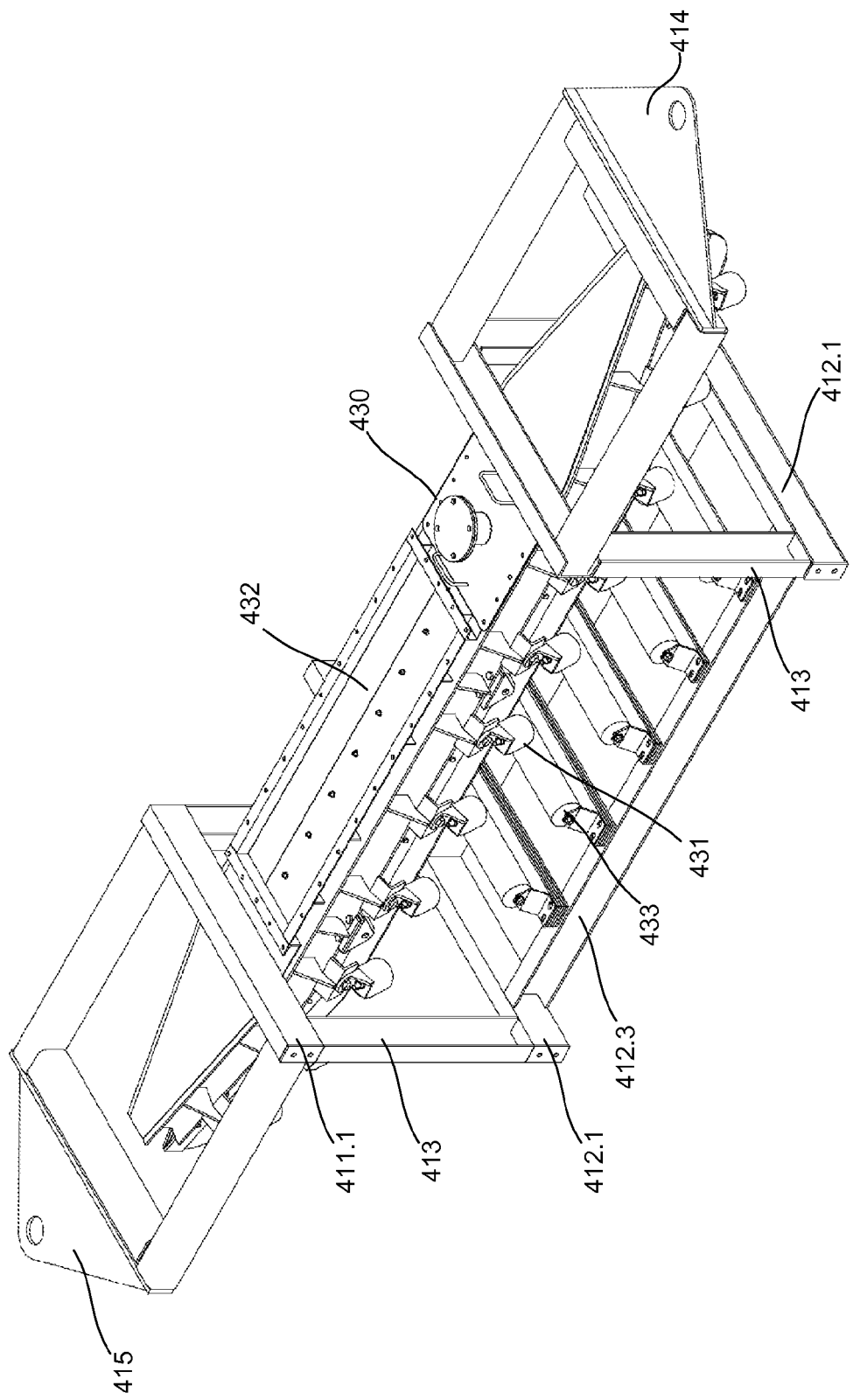
FIG. 4B is a schematic perspective view of a part of a first loading frame for supporting a former.
Figure 4C:
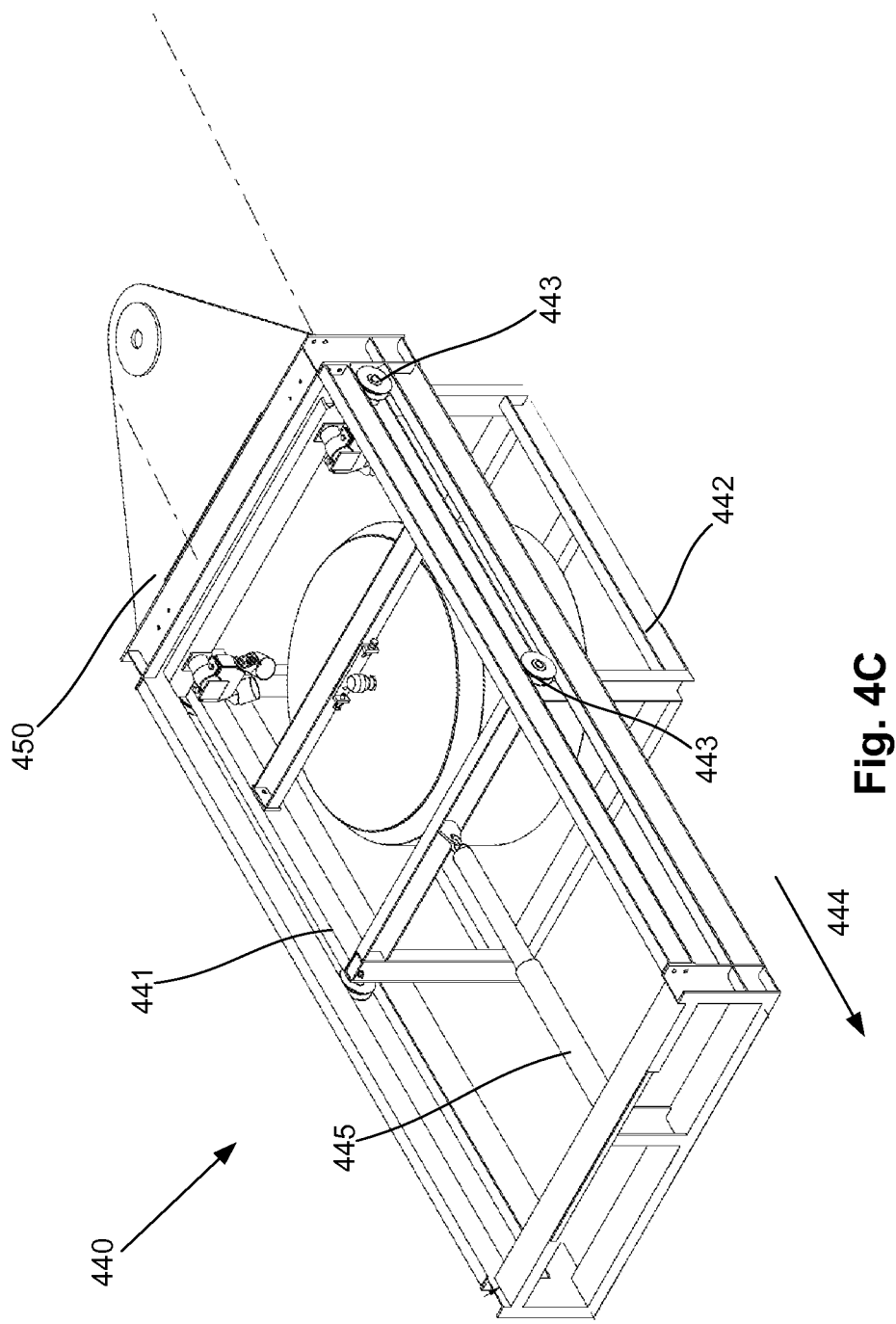
FIG. 4C is a schematic perspective view of a first example of a second loading frame for supporting a belt return roller.

An example of a loading carriage will now be described in more detail with reference to FIGS. 4A to 4C.

In this example the loading carriage includes a first loading frame 410, including upper and lower frames interconnected by support posts 413. Whilst the frames can be of any suitable arrangement, in one example, the upper and lower frames include lateral frame members 411.1, 412.1 interconnected by elongate spines 411.2, 412.2. The lower frame also includes roller supports 412.3 extending between the lateral frame members 412.1, for supporting a number of belt support rollers 433, as will be described in more detail below.

The first loading frame 410 also includes end pieces 416, 416, which act as connectors, allowing the first loading frame 410 to be connected to the frame of adjacent carriages and a second loading frame 440. Carriage rollers 414 are coupled to the first loading frame 410 via a bracket 415, for suspending the first loading frame 410 from the track (not shown).

In this example, the upper frame supports an elongate roller station support member 421, having a number of idler roller stations 422 for supporting the conveyor belt (not shown) on the conveyor belt return path. The idler roller stations 422 are substantially as described above and these will not therefore be described in any further detail.

The first loading frame 410 supports a former 430 having a number of former belt rollers 431 mounted therealong. In use the endless belt is fed over the former 430, so that the belt edges 132 pass between the former 430 and the former belt rollers 431. In this arrangement, the former belt rollers 431 urge the belt edges 132 against the former 430 so that the belt edges are guided apart by the former thereby allowing material to be loaded onto the belt through a loading aperture 432 provided in the former 430.

In addition, the first loading frame 410 includes roller supports 412.3 for supporting lateral belt support rollers 433 mounted beneath the former 430, for supporting the belt 130 during the loading process. In particular, this absorbs the office of material impacting on the belt as the material is loaded therein, thereby ensuring that the belt does not disengage from the former belt rollers 431 during the loading process.

The loading carriage 121 also includes a second loading frame 440 for supporting a belt return roller 441 for transporting the belt between the return path and the transport path.

In one example, the belt return roller 441 mounted on a moveable support frame 442, which is moveably mounted to the second loading frame 440 by support rollers 443. A biasing mechanism can be provided for biasing the belt return roller 441 in the direction of arrow 444, thereby maintaining the conveyor belt 130 under tension.

Any suitable biasing mechanism can be used. In the example of FIG. 4A, the biasing mechanism is an actuator 445 such as a hydraulic a piston arrangement or the like. In an alternative example shown in FIG. 4D, a vertical support frame 460 is used to support a weight 461, which is connected via a cable 462 to the movable support frame 442, so that action of the weight applies a force in direction 444 to thereby tension the belt.

The second loading frame 440 typically includes two pairs of carriage rollers 446, coupled to the frame 440 via respective brackets 447, for mounting the frame 440 on the track (not shown). At least one set of carriage rollers 446 is coupled to a drive motor 448, allowing the loading carriage to be moved relative to the track 110.

The second loading frame 440 also typically includes an end piece 450 that allows the second frame 440 to be connected to the first frame 410. The second frame 440 may also include at least one driver station 451, which is of a form similar to that of the driver stations 332 described above, and is mounted on a support member 452 that projects outwardly from the second frame 440, as shown.

Figure 5A:
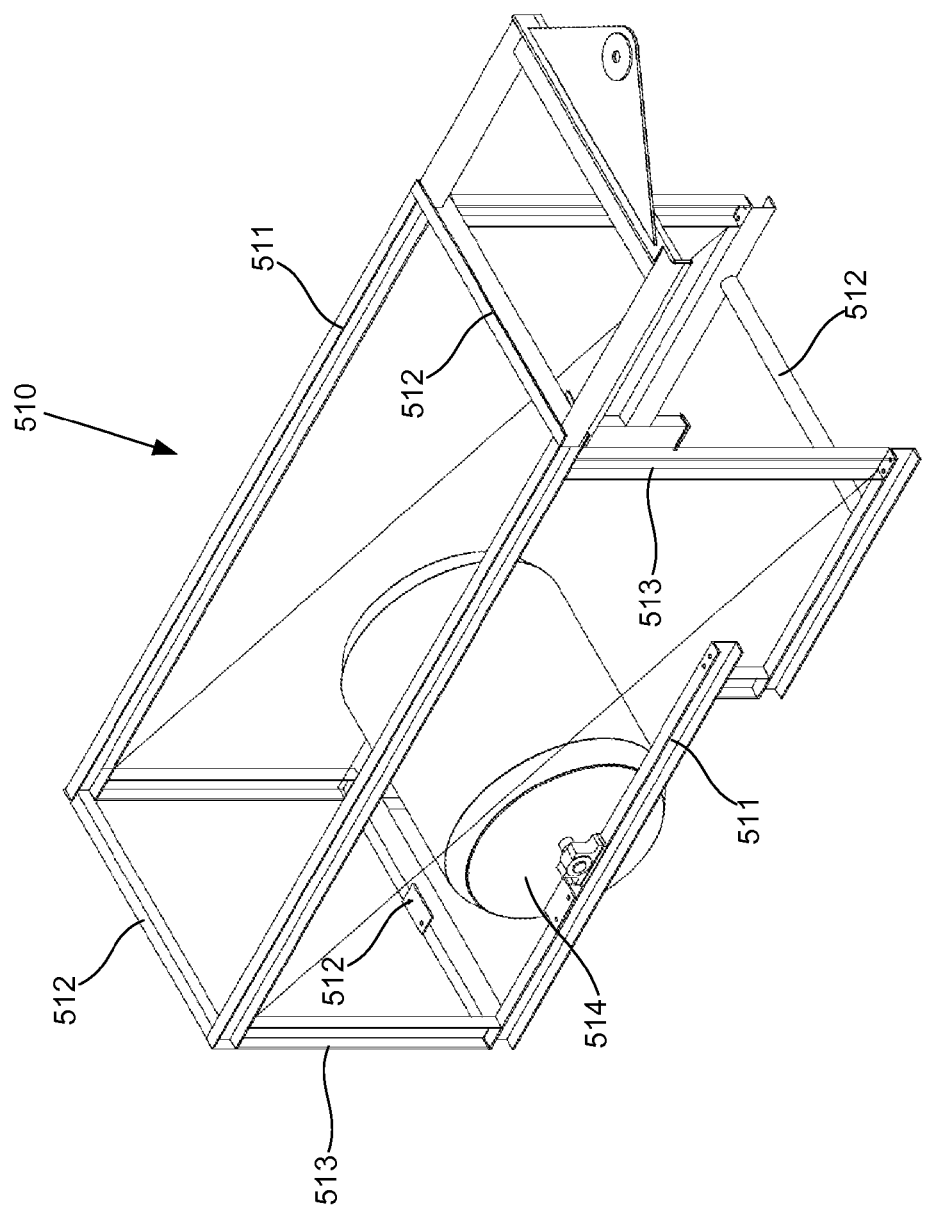
FIG. 5A is a schematic perspective view of a first discharge frame supporting a discharge roller.

An example of a discharge carriage will now be described with reference to FIG. 5.

In this example, the discharge station includes a first frame 510 formed of a number of longitudinal, lateral and upright beams 511, 512, 513. The frame 510 supports a discharge roller 514 which in this example is a horizontally supported roller. In use, the conveyor belt 130 is entrained around the discharge roller 514 in a manner similar to that described above with reference to FIG. 1F allowing material to be discharged therefrom.

Figure 5B:
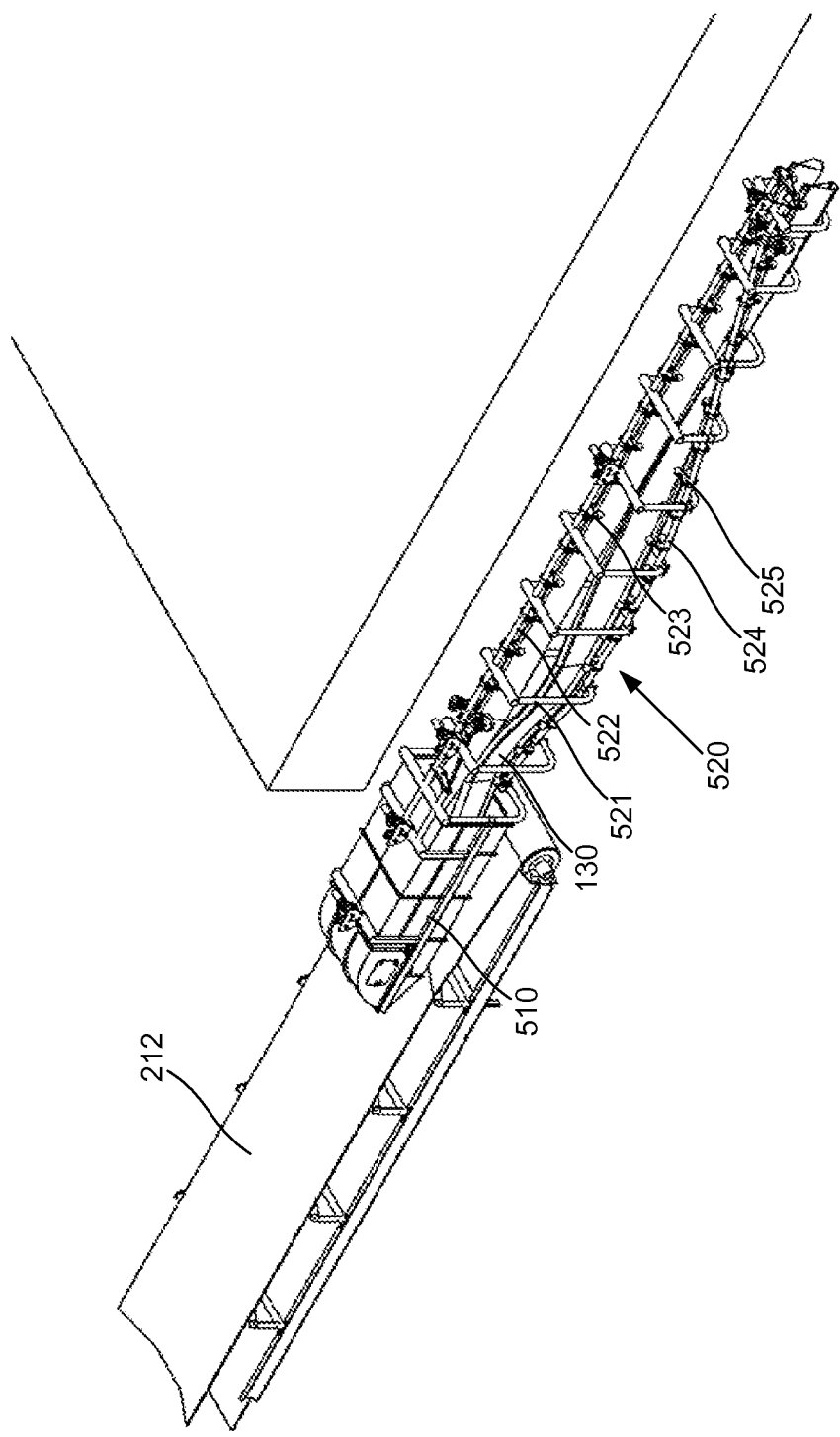
FIG. 5B is a schematic perspective view of a second discharge frame supporting a number of roller stations.

The belt is transferred from the transport path to the discharge roller 514, and from there to the return path, using an arrangement of idler rollers, as shown in FIG. 5B.

In this example, the discharge carriage includes a second discharge frame 520 formed from a number of longitudinally spaced rectangular frames 521, which are interconnected by elongate roller station support members 522, 524 that support respective roller stations 523, 525 for supporting the conveyor belt 130 along the transport and return paths, respectively. As shown, the elongate roller station support member 522 for the transport path is configured to allow the belt to pass along the transport path and then engage an upper side of the discharge roller 514. The elongate roller station support member 524 has a corkscrew shaped configuration, so that as the conveyor belt 130 passes around and returns from an underside of the discharge roller 514, the conveyor belt 130 is engaged by the roller stations 525 and twists back to the position required for movement along the return path.

Figure 6:
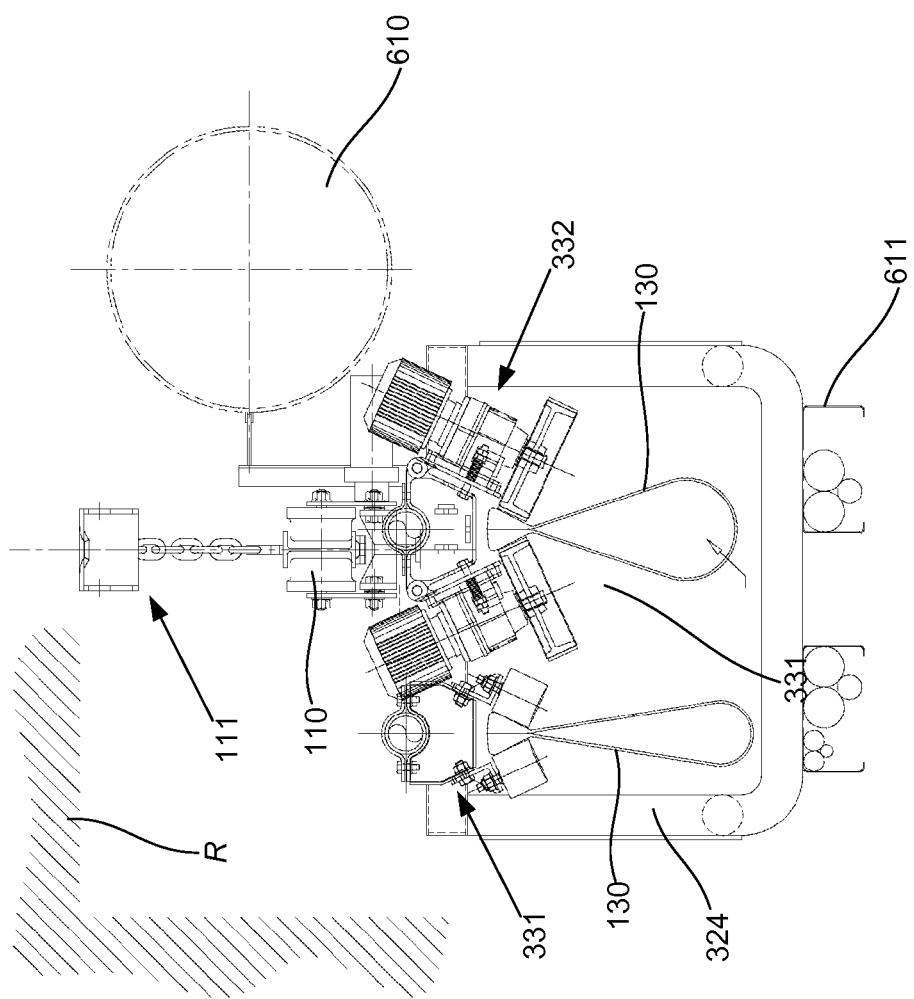
FIG. 6 is a schematic end view of an example of an intermediate carriage in use; and, FIG. 7 is a schematic diagram of an example of a controller.

An example of an intermediate carriage supporting a belt on transport and return paths is shown in cross-section in FIG. 6.

As also shown in this example, the carriage can be utilised to support ducting, such as a ventilation duct 610, whilst mine services can be provided by ducting 611 coupled to an underside of the carriages. This allows the same infrastructure that is used to support the conveyor system to also support additional mine services such as airflow, power, water and the like. This advantageously allows air and other mine services to be supplied to a region in the vicinity of the continuous miners, or other parts of the mine as required, thereby preventing the need for separate supply systems.

As the carriages are suspended at a single point across their width, the carriage rollers are typically positioned above the centre of mass of the carriage, to ensure that the carriage remains level in use. As the amount of material in the belt may vary along the transport path, this can alter the position of the centre of mass of the carriage. In one example, this can be accommodated by aligning the transport path with the centre of mass, for example, by positioning the transport path below the track. Alternatively, the carriages can include a moveable weight, allowing the centre of mass to be adjusted as the weight of material in the belt changes.

Figure 7:
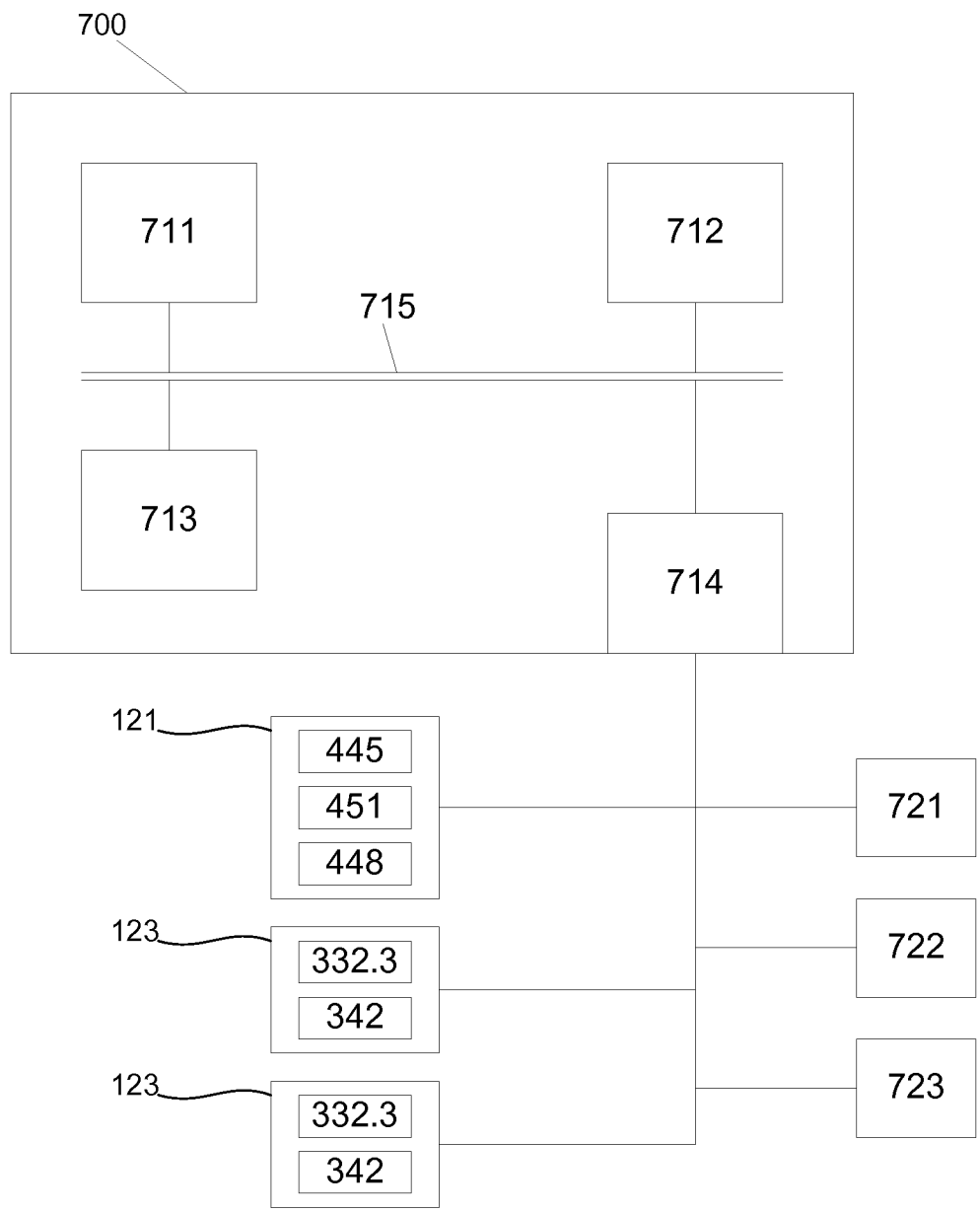

An example of a controller for use in controlling the system will now be described with reference to FIG. 7.

The controller 700 typically includes an electronic processor 711, a memory 712, an input/output device 713 and an interface 714 interconnected via a bus 715. In this example the external interface 714 is utilised for connecting the controller 700 to peripheral systems, such as drive motors and/or associated controllers, as well as one or more sensors 711, 712, 713. The interface 714 may also be used to connect to communications networks, databases, other storage devices, or the like. Although a single external interface is shown, this is for the purpose of example only, and in practice multiple interfaces using various methods (e.g. Ethernet, serial, USB, wireless, mobile networks or the like) may be provided. It will also be appreciated that additional hardware components, may be incorporated into the controller 700, depending on the particular implementation.

In use, the processor 711 executes instructions in the form of applications software stored in the memory 712 to allow the controller to interpret signals from the sensors 721, 722, 723, and control movement of the conveyor belt 130 and the carriages 121, 122, 123. In particular, the controller is adapted to generate control signals for controlling the actuator 445, and the drive motors 448, 451 for the loading carriage 121, as well as motors 332.3, 342 for the intermediate carriages 122, and motors (not shown) for the discharge carriage. The sensors can include belt speed and material weight sensors 721, 722, as well as optional belt rip sensors 723.

In use, operation of the belt drive motors 451, 332.3 are controlled by the processor 711 to allow movement and in particular speed of the belt to be controlled. The control signals are typically used to control the power applied by the belt drive motors 451, 332.3, with the power being controlled depending on the weight of material being carried on the belt.

Operation of the carriage drive motors for controlling the position of the carriages 121, 122, 123 is typically controlled in accordance with input commands provided by an operator, for example using a suitable input 713. This allows an operator to selectively move the position of the loading and discharge points, as required for example, to accommodate movement of a continuous miner or other equipment. Alternatively, this could be achieved automatically, of example, by having the controller detect the position of the continuous miner using appropriate sensors.

Accordingly, it will be appreciated that the controller 700 may be formed from any suitably programmed processing system, and the processor 111 can be any form of electronic processing device such as a microprocessor, microchip processor, logic gate configuration, firmware optionally associated with implementing logic such as, an FPGA (Field Programmable Gate Array), or any other electronic device, capable of interpreting signals from the sensors 721, 722, 723 and generating appropriate control signals.

A further specific example of intermediate, loading and discharge carriages suitable for use in transport system will now be described with reference to FIGS. 8, 9A and 9B and 10A and 10B, respectively.

Figure 8:
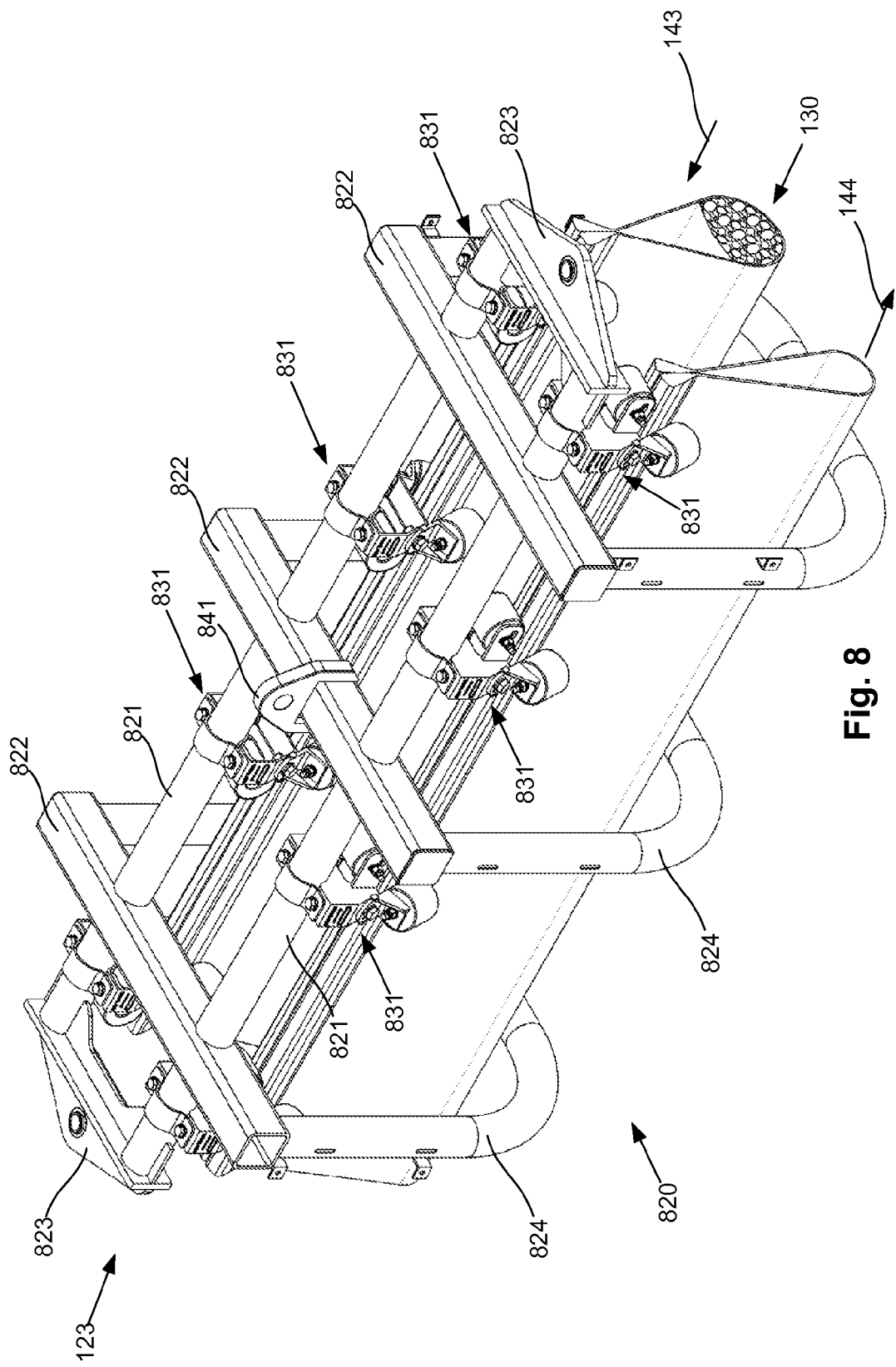
FIG. 8 is a schematic perspective view of a second example of an intermediate carriage.

In the example of FIG. 8, the intermediate carriage 123 includes a carriage frame 820, including parallel spaced-apart elongate roller station support members 821 extending longitudinally along the intermediate carriage, for supporting roller stations 831 for the transport and return paths 143, 144.

The roller station support members 821 are interconnected and supported by lateral frame members 822 spaced along the roller station support members 821, and optional end pieces 823, which can be used to couple the carriage 123 to other adjacent carriages.

The frame 820 further includes a number of spaced apart U-shaped frame members 824, each U-shaped frame member 824 being coupled to an underside of a respective lateral frame member, so that the U-shaped frame members 824 extend around the belt 130 on the transport and return paths. This can assist in providing additional structural support, as well as acting as a safety guard to prevent inadvertent contact with the belt 130.

The frame 820 is movably mounted to the track 110 via carriage rollers (not shown), coupled to the frame 820 via a mounting 841. A drive motor (not shown) is connected to the carriage rollers, allowing the carriage to be moved along the track (not shown) using a suitable control, as previously described. The frame 820 is typically formed from a combination of steel tubes, rectangular hollow section (RHS) beams, or the like.

The roller station support members 821 support a number of roller stations, which in the example of FIG. 8 includes idler roller stations 831. It will be appreciated however, that as in the previous examples, both idler roller stations 831 and driver roller stations (not shown) may be provided. The idler roller stations 831 and driver roller stations are typically similar in form to those described above with respective to FIGS. 3C and 3D, and these will not therefore be described in any further detail.

As in the previous example, a number of driver stations are provided along the entire length of the conveyor belt 130 so that the belt is evenly driven along its length. This avoids unnecessary force being applied to the belt in any one particular area, which in turn can have an impact on belt wear and operation. Accordingly, the intermediate carriages 123 will typically include a mixture of intermediate carriages shown in FIG. 8 and similar carriages including driver roller stations, although this is not essential and alternatively driving may occur at every carriage, depending on the preferred implementation.

Figure 9A:
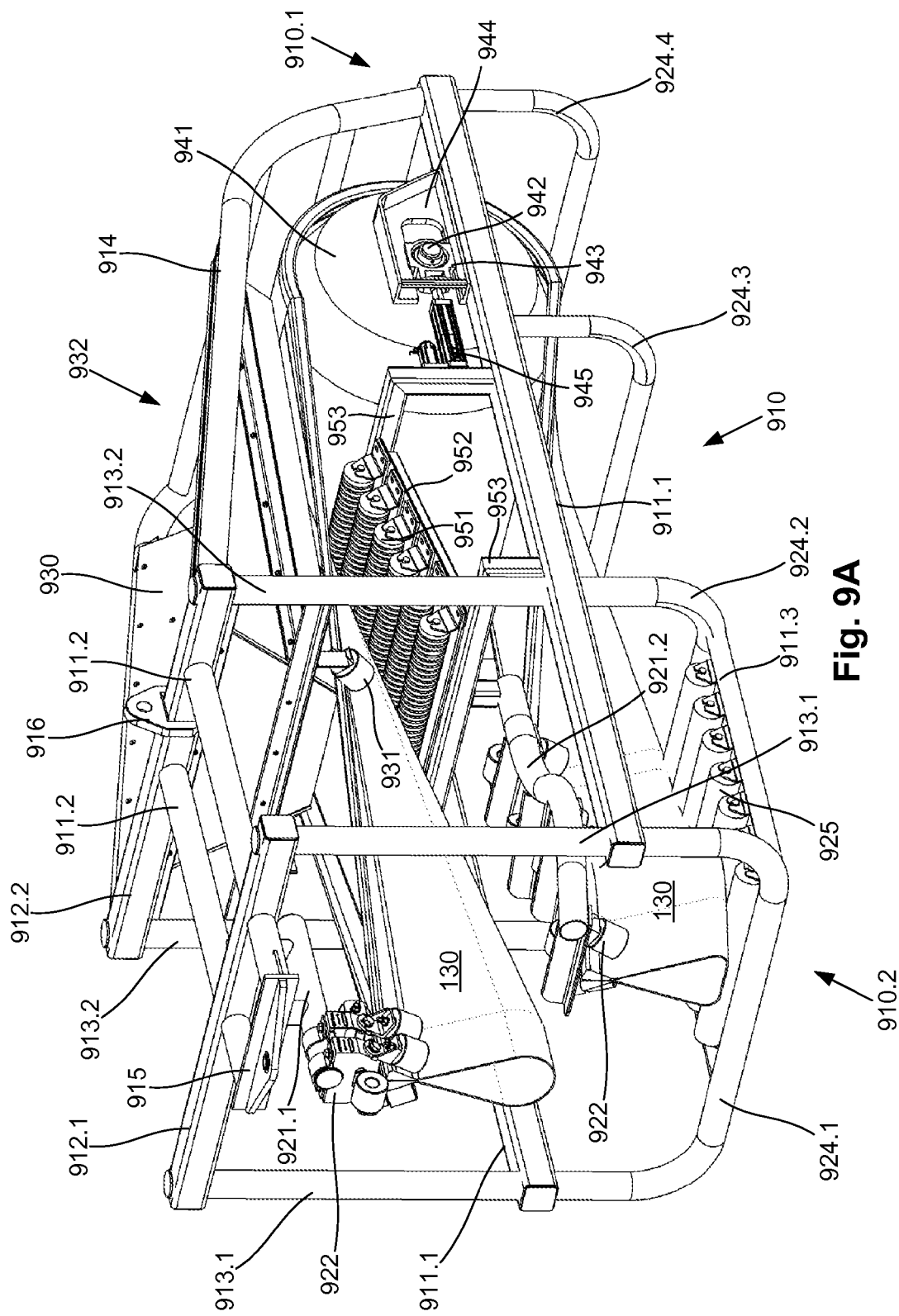
FIG. 9A is a schematic perspective view of a second example of a loading carriage.
Figure 9B:
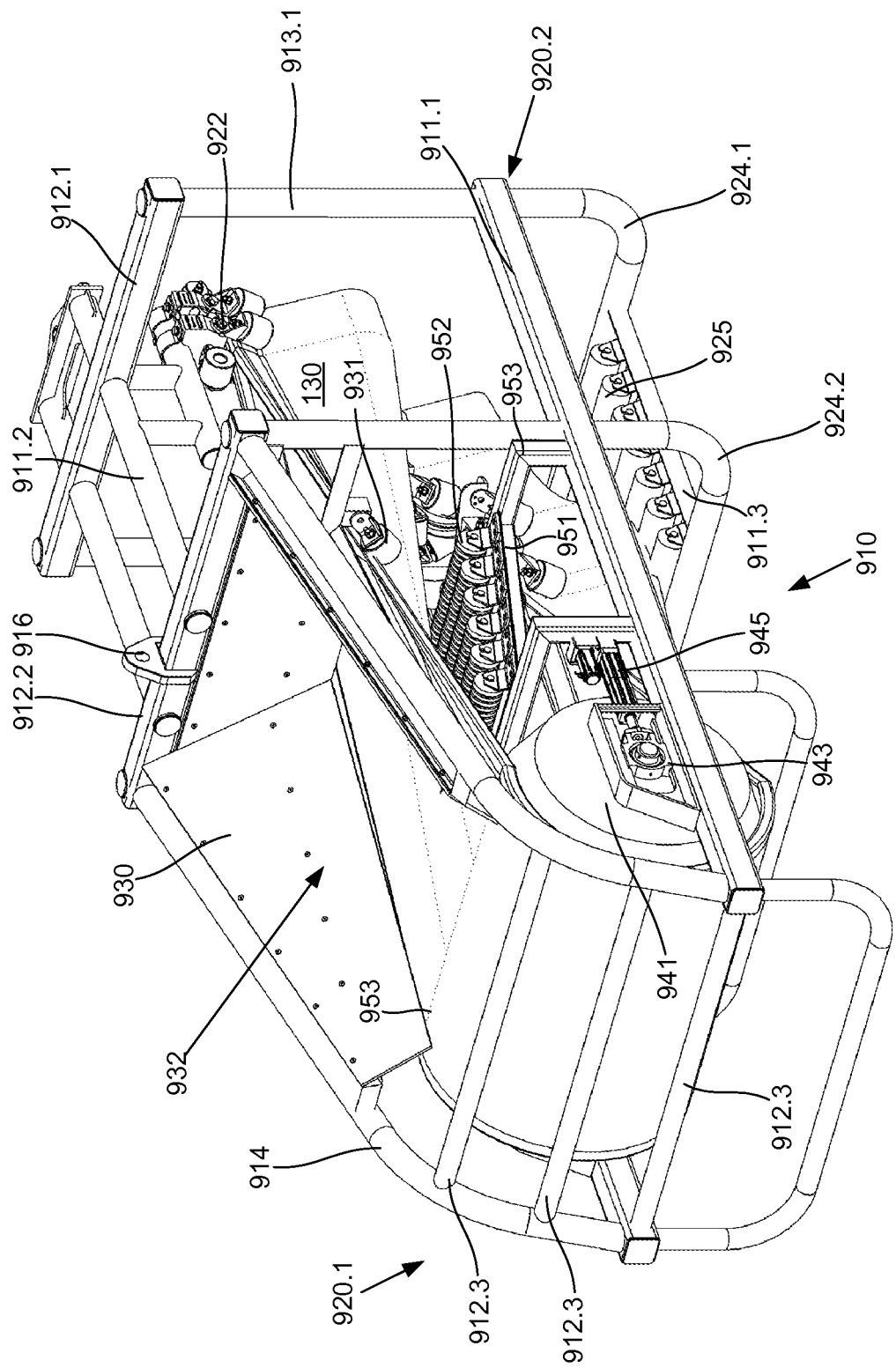
FIG. 9B is a second schematic perspective view of the loading carriage of FIG. 9A.

An example of a loading carriage will now be described in more detail with reference to FIGS. 9A and 9B.

In this example the loading carriage 121 includes a loading frame 910, having two central longitudinal frame members 911.1 extending along a length of either side of the frame, 910 from a loading end 910.1 to a belt path end 910.2.

The frame 910 includes a number of spaced apart U-shaped frame members 924.1, 924.2, 924.3, 924.4 extending laterally between the longitudinal frame members 911.1 to support the longitudinal frame members 911.1 in a spaced apart arrangement, as well as acting as a safety guard to prevent inadvertent contact with the belt 130 and other loading station components.

The longitudinal frame members 911.1 are coupled to longitudinally spaced upright belt path support posts 913.1, 913.2 provided proximate the belt path end 910.2. The belt path support posts 913.1, 913.2 are interconnected at upper ends by lateral belt path support members 912.1, 912.2, which are in turn interconnected by longitudinal connecting members 911.2.

The belt path end 910.2 of the frame 910 supports transport and return elongate roller station support members 921.1, 921.2, having a number of idler roller stations 922.1, 922.2 for supporting the conveyor belt (not shown) on the conveyor transport and belt return paths, respectively. The idler roller stations 922 are substantially as described above and these will not therefore be described in any further detail. The U-shaped frame members 924 at the belt end 910.2 are interconnected by return path support arms 911.3 also support a number of lateral rollers 925 for supporting the conveyor belt along the belt return path.

The belt path end 910.2 of the frame 910 also includes an end piece 915, which acts as a connector, allowing the loading frame 910 to be connected to the frame of adjacent intermediate carriages 123. Carriage rollers (not shown), are coupled to the first loading frame 910 via a bracket 916, for suspending the first loading frame 410 from the track (not shown).

The frame 910, and in particular, the elongate frame members 911.1 support a belt return roller 941 for transporting the belt between the return path and the transport path. In one example, the belt return roller 941 is coupled via an axle 942 to shuttles 943 movably mounted within belt return roller mounting brackets 944. The shuttles 943 are movable in a longitudinal direction and are coupled to a biasing mechanism in the form of pistons 945, which can be used for biasing the belt return roller 941 in the direction of arrow 946, thereby maintaining the conveyor belt 130 under tension.

Loading support arms 914 extend from the upper end of the support posts 913.2 to the loading end of the longitudinal frame members 911.1, and include a number of lateral support members 912.3. The loading support arms 914 support a loading chute 930, defining a loading aperture 932, between the loading support arms 914. The loading chute 930 supports a number of chute belt rollers 931, for supporting the belt as it is transported from the belt return roller 941 to the idler roller stations 922.1.

A number of loading rollers 951 are mounted on a loading roller support 952. The loading roller support 952 is coupled to lateral loading roller support members 953, which are in turn coupled to the longitudinal frame members 911.1, thereby supporting the loading rollers 951 beneath the chute 930, thereby supporting the belt 130 during the loading process. In particular, this absorbs the office of material impacting on the belt as the material is loaded therein, thereby ensuring that the belt does not disengage from the chute belt rollers 931 during the loading process.

In use, the belt extends, from the belt return path, over the belt return roller 941, and under the chute 930, and along the belt transport path, thereby allowing material to be loaded onto the belt via the chute 930.

Figure 10A:
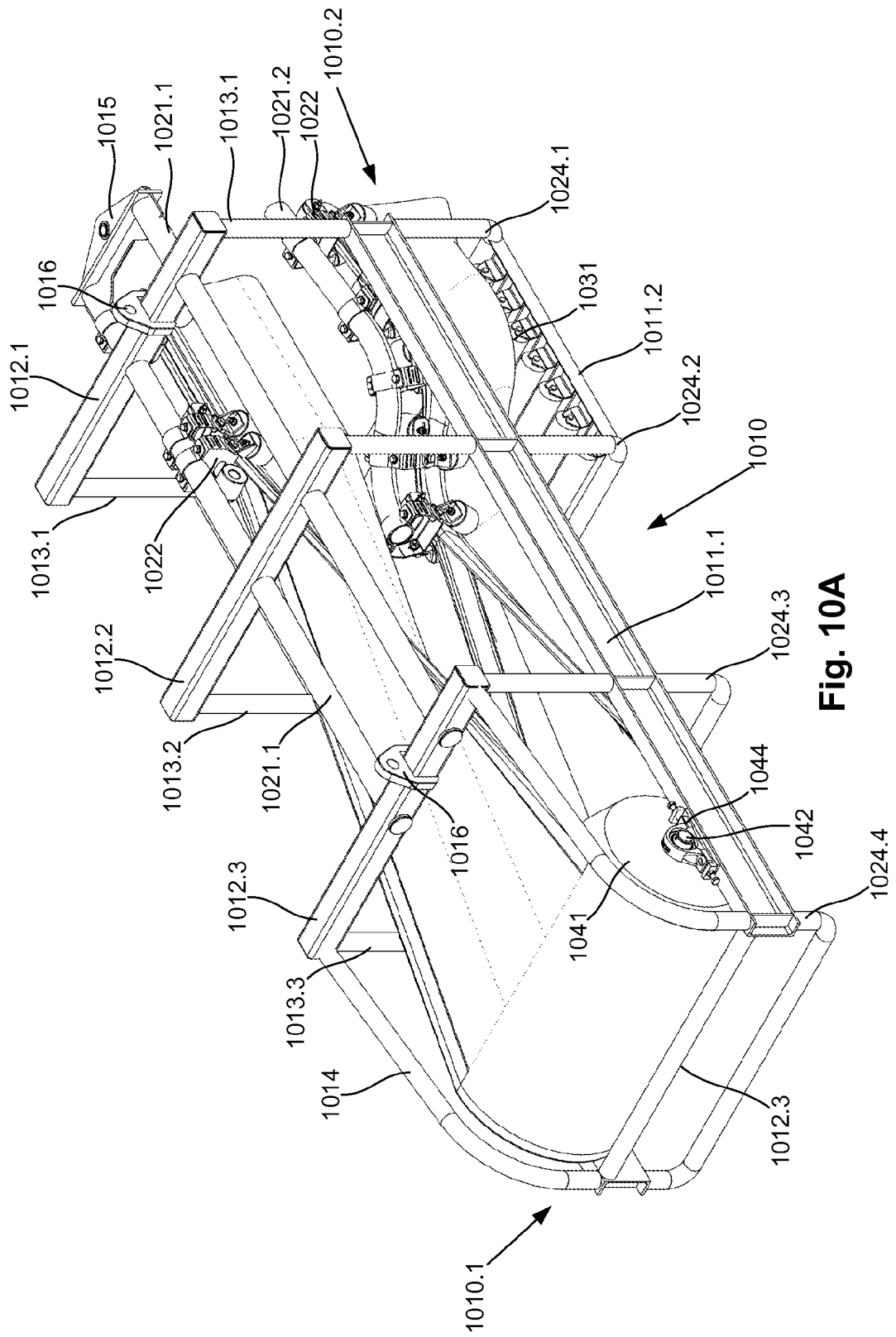
FIG. 10A is a schematic perspective view of a second example of a discharge carriage.
Figure 10B:
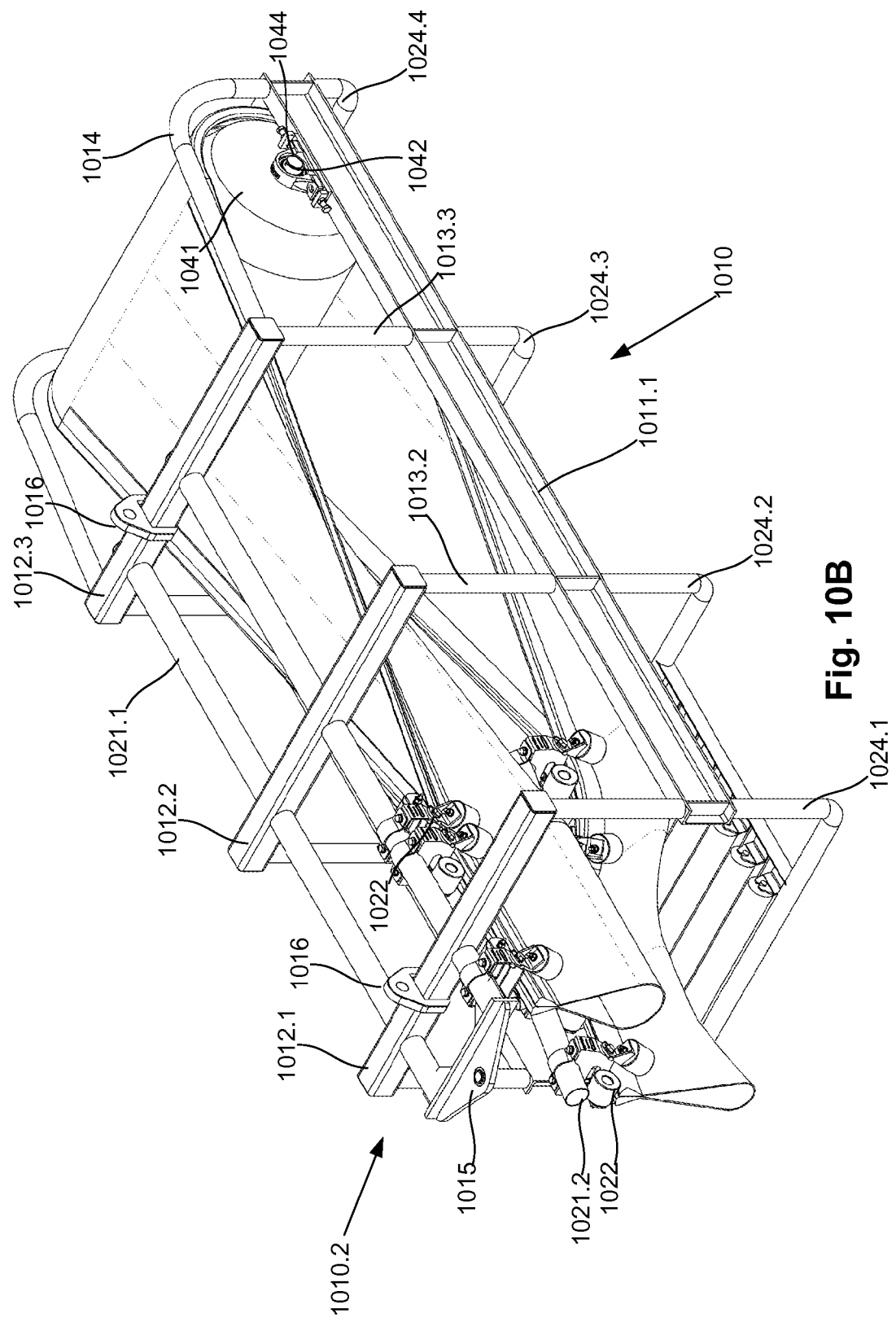
FIG. 10B is a second schematic perspective view of the discharge carriage of FIG. 10A; and, FIG. 11 is a schematic end view of the intermediate carriage of FIG. 8 in use.

An example of a discharge carriage will now be described with reference to FIGS. 10A and 10B.

In this example the discharge carriage 122 includes a discharge frame 1010, having two central longitudinal frame members 1011.1 extending along a length of either side of the frame 1010 from a discharge end 1010.1 to a belt path end 1010.2.

The frame 1020 includes a number of spaced apart U-shaped frame members 1024 extending laterally between and from an underside of the longitudinal frame members 1011.1 to support the longitudinal frame members 1011.1 in a spaced apart arrangement, as well as acting as a safety guard to prevent inadvertent contact with the belt 130 and other discharge station components.

Each longitudinal frame member 1011.1 is coupled to three longitudinally spaced upright belt path support posts 1013.1, 1013.2, 1013.3. The belt path support posts 1013.1, 1013.2, 1013.3 are interconnected at upper ends by lateral belt path support members 1012.1, 1012.2, 1012.3, which in turn supports upper elongate roller station support members 1021.1. A return path roller station support member 1021.2 is also provided, with the elongate roller station support members 1021.1, 1021.2, having idler roller stations 1022.1, 1022.2 for supporting the conveyor belt (not shown) on the conveyor transport and belt return paths, respectively. The idler roller stations 1022 are substantially as described above and these will not therefore be described in any further detail. The U-shaped frame members 1024.1, 1024.2 at the belt end 1010.2 are interconnected by return path support arms 1011.2 also support a number of lateral rollers 1031 for supporting the conveyor belt along the belt return path.

The belt path end 1010.2 of the frame 1010 also includes an end piece 1015, which acts as a connector, allowing the loading frame 1010 to be connected to the frame of adjacent intermediate carriages 123. Carriage rollers (not shown), are coupled to the first loading frame 1010 via brackets 1016, for suspending the discharge frame 1010 from the track (not shown).

The frame 1010, and in particular, the elongate frame members 1011.1 support a discharge roller 1041 for transporting the belt between the return path and the transport path. In one example, the discharge roller 1041 is coupled via an axle 1042 to mounting brackets 1044. In this example, although biasing of the discharge roller is not shown, it will be appreciated that this could be achieved using a similar mounting arrangement to that used for the belt return roller on the loading carriage, if required.

Discharge support arms 1014 extend from the upper end of the support posts 1013.3 to the loading end of the longitudinal frame members 1011.1, for providing additional structural support.

In use, the belt extends, from the transport path, over the discharge roller 1041, and under the chute along the belt return path, thereby allowing material to be discharged as the belt passes over the discharge roller.

Figure 11:
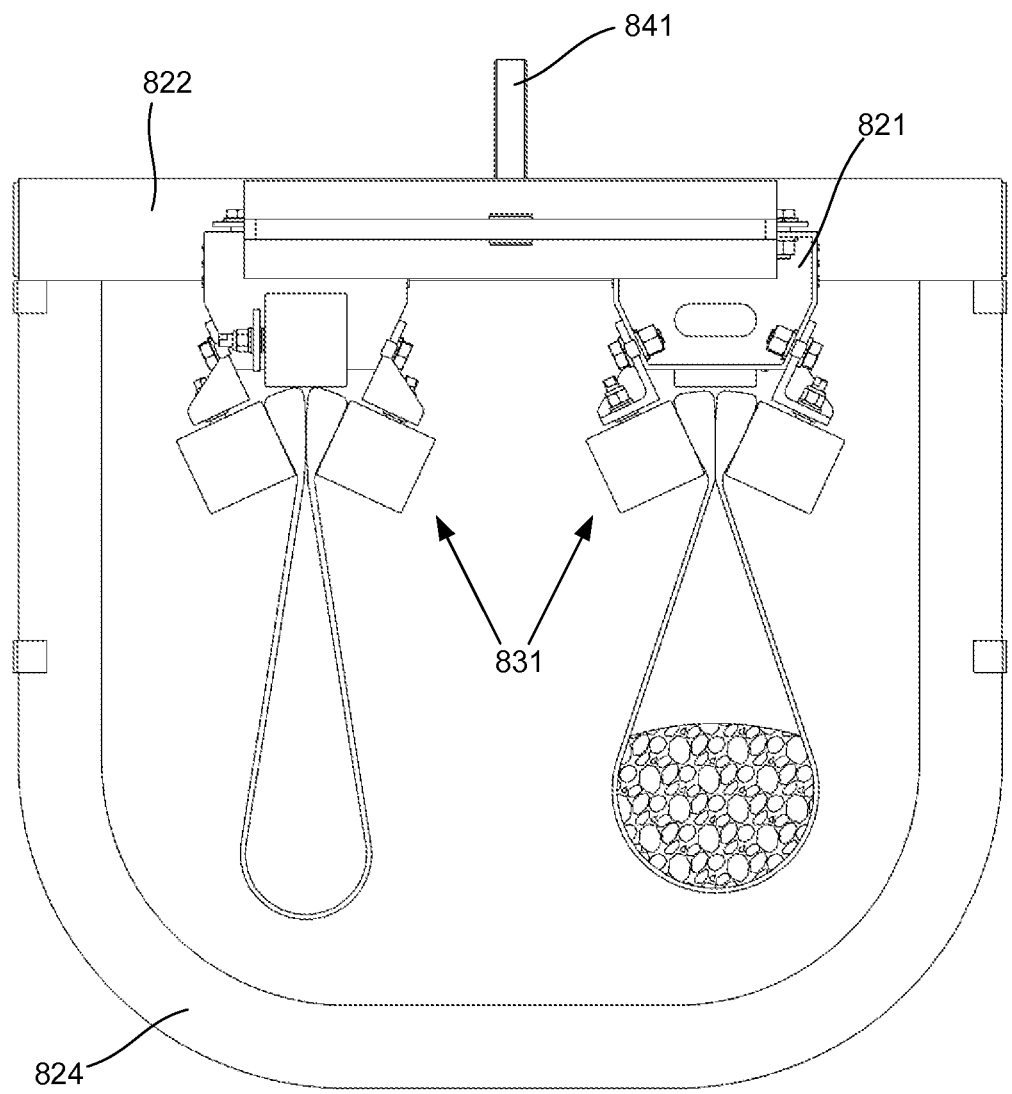

An example of an intermediate carriage supporting a belt on transport and return paths is shown in cross-section in FIG. 11, and it will therefore be appreciated that this arrangement is similar to that described with respect to FIG. 6.

However, in the example of FIGS. 8 to 11, the belt is arranged inside out (ie with the material engaging surface on an outer side of the tear drop shape) on the return path. This is feasible as the arrangement of the thickened edges 132 allows the belt to be supported in an inside out arrangement in the same way as when the belt is in the normal arrangement on the transport path. However, allowing the belt to be transported in an inside out arrangement facilitates transition between the transport path and the belt return path at the discharge and loading stations, thereby simplifying the apparatus. In particular, this allows a single horizontally aligned belt return roller and discharge roller to be provided on the loading and discharge carriages respectively, thereby allowing the belt to easily transition between the transport and return paths.

Accordingly the above described conveyor system provides a method for transporting material from a loading region to a discharge region. By supporting the conveyor belt from carriages, which are in turn moveably mounted to a track, this allows the exact loading and discharge point within the loading and discharge regions to be adjusted. This therefore facilitates transfer of material from moving equipment, such as a continuous miner, or other similar machine. Furthermore, utilising a tubular belt allows the conveyor to extend around corners, making the system particularly suitable for use in underground mining.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A conveyor system for use in mining, the conveyor system including:
   a) a track extending between a loading region and a discharge region;
   b) an endless belt bendable into a tubular shape, the endless belt having thickened edges;
   c) a number of carriages moveably mounted to the track, the carriages including belt rollers for engaging the edges of the belt to thereby support the belt;
      i) a loading carriage for allowing material to be loaded onto the belt, the loading carriage being moveable at least within the loading region;
      ii) a discharge carriage for allowing material to be discharged from the belt, the discharge carriage being moveable at least within the discharge region;
      iii) a number of intermediate carriages positioned between the loading and discharge carriages for supporting the belt along transport and return paths with the tubular shape; and,
   d) a number of belt driver rollers for driving the belt, the belt driver rollers being provided on at least some of the intermediate carriages.

2. A conveyor system according to claim 1, wherein carriages further include a carriage drive for moving the carriage relative to the track.

3. A conveyor system according to claim 1, wherein each carriage includes:
   a) a frame;
   b) a number of roller stations mounted to the frame, the roller stations supporting the belt rollers; and,
   c) a coupling for movable mounting the carriage relative to the track.

4. A conveyor system according to claim 3, wherein the coupling includes carriage rollers coupled to the frame via a bracket.

5. A conveyor system according to claim 3, wherein the includes a safety guard extending around the belt transport and return paths.

6. A conveyor system according to claim 3, wherein the frame supports ducting for services.

7. A conveyor system according to claim 3, wherein, for intermediate carriages, the frame includes:
   a) spaced apart elongate roller station support members for supporting roller stations for the transport and return paths, respectively; and,
   b) a number of lateral frame members for supporting the elongate roller station support members.

8. A conveyor system according to claim 3, wherein the loading carriage includes:
   a) a former mounted to the frame, the former including a loading aperture; and,
   b) belt rollers for urging edges of the belt against the former so that the belt edges are guided apart by the former thereby allowing material to be loaded onto the belt through the loading aperture.

9. A conveyor system according to claim 8, wherein the loading carriage includes:
   a) a first loading frame for supporting at least the former; and,
   b) a second loading frame for supporting a belt return roller.

10. A conveyor system according to claim 8, wherein the loading carriage includes a belt return roller for transporting the belt between the return path and the transport path.

11. A conveyor system according to claim 3, wherein the loading carriage includes:
    a) a belt return roller for transporting the belt between the return path and the transport path;
    b) a roller station for supporting belt rollers; and,
    c) a chute mounted to the frame to define a loading aperture between the belt return roller and the roller station.

12. A conveyor system according to claim 11, wherein the conveyor system includes chute belt rollers for supporting the belt as it is transported from the belt return roller to the idler roller station.

13. A conveyor system according to claim 10, wherein the belt return roller is movably mounted to the frame to allow movement of the belt return roller to be used in maintaining a belt tension.

14. A conveyor system according to claim 10, wherein the loading carriage includes a biasing mechanism for biasing the belt return roller.

15. A conveyor system according to claim 3, wherein the discharge carriage includes a discharge roller supported by the frame, the discharge roller supporting the belt in an open shape, the discharge roller transporting the belt from the transport to the return path.

16. A conveyor system according to claim 15, wherein the discharge carriage includes:
    a) a first discharge frame for supporting the discharge roller; and,
    b) a second discharge frame for supporting a number of roller stations to guide the belt onto and from the discharge roller.

17. A conveyor system according to claim 1, wherein the carriages are suspended substantially below the track in use.

18. A conveyor system according to claim 1, wherein the track is a monorail track.

19. A conveyor system according to claim 1, wherein the belt is supported inside out on the return path compared to the transport path.

20. A conveyor system for use in mining, the conveyor system including:
    a) a track extending between a loading region and a discharge region;
    b) an endless belt bendable into a tubular shape, the endless belt having thickened edges;
    c) a number of carriages moveably mounted to the track, the carriages including belt rollers for engaging the edges of the belt to thereby support the belt;
       i) a loading carriage for allowing material to be loaded onto the belt, the loading carriage being moveable at least within the loading region;
       ii) a discharge carriage for allowing material to be discharged from the belt, the discharge carriage being moveable at least within the discharge region;
       iii) a number of intermediate carriages positioned between the loading and discharge carriages for supporting the belt along transport and return paths with the tubular shape; and,
       iv) a carriage drive mounted on at least some of the carriages for moving the carriages relative to the track.

* * * * *